US012025013B2

(12) United States Patent
Altieri et al.

(10) Patent No.: US 12,025,013 B2
(45) Date of Patent: Jul. 2, 2024

(54) ROTATING MACHINE COMPONENT CLEARANCE SENSING SYSTEMS AND METHODS

(71) Applicant: LORD Corporation, Cary, NC (US)

(72) Inventors: Russell E. Altieri, Holly Springs, NC (US); Victor Zaccardo, Durham, NC (US); Paul R. Black, Apex, NC (US); Douglas Swanson, Cary, NC (US); Daniel E. Kakaley, Cary, NC (US)

(73) Assignee: LORD Corporation, Cary, NC (US)

( * ) Notice: Subject to any disclaimer, the term of this patent is extended or adjusted under 35 U.S.C. 154(b) by 50 days.

(21) Appl. No.: 17/629,548

(22) PCT Filed: Jul. 24, 2020

(86) PCT No.: PCT/US2020/043523
§ 371 (c)(1),
(2) Date: Jan. 24, 2022

(87) PCT Pub. No.: WO2021/016568
PCT Pub. Date: Jan. 28, 2021

(65) Prior Publication Data
US 2022/0268171 A1 Aug. 25, 2022

Related U.S. Application Data

(60) Provisional application No. 63/041,484, filed on Jun. 19, 2020, provisional application No. 62/878,018, filed on Jul. 24, 2019.

(51) Int. Cl.
*F01D 21/00* (2006.01)
*F01D 11/12* (2006.01)
*G01B 7/14* (2006.01)

(52) U.S. Cl.
CPC .......... *F01D 21/003* (2013.01); *F01D 11/122* (2013.01); *G01B 7/14* (2013.01);
(Continued)

(58) Field of Classification Search
CPC .. F01D 11/14; F01D 11/20–24; F01D 21/003; F01D 17/02; F05D 2240/307;
(Continued)

(56) References Cited

U.S. PATENT DOCUMENTS 3,932,813 A   1/1976  Gallant
4,967,153 A * 10/1990 Langley ................. G01P 3/488
                                                        73/660

(Continued)

FOREIGN PATENT DOCUMENTS

EP   0 806 680 A2   11/1997
EP   2 131 201 A1   12/2009
(Continued)

OTHER PUBLICATIONS

International Search Report and Written Opinion for Application PCT/US2020/043523 dated Nov. 26, 2020.
(Continued)

*Primary Examiner* — Brian P Wolcott
(74) *Attorney, Agent, or Firm* — KDW FIRM PLLC

(57) ABSTRACT

Systems and methods for measuring a clearance between a rotating machine component and a sensor unit are disclosed. In some aspects, a system includes a sensor unit oriented to detect the rotating machine component as the rotating machine component rotates past the sensor unit, the sensor unit including at least a first sensing element and a second sensing element spaced apart from the first sensing element. The system includes a sensor processing unit in electrical communication with the sensor unit. The sensor processing unit is configured for receiving a first waveform from the
(Continued)

first sensing element; receiving a second waveform from the second sensing element; and determining, based on a comparison between the first waveform and the second waveform, a distance between the blade tip and the sensor unit.

15 Claims, 23 Drawing Sheets

(52) U.S. Cl.
CPC .. *F05D 2270/303* (2013.01); *F05D 2270/304* (2013.01); *F05D 2270/305* (2013.01); *F05D 2270/802* (2013.01); *F05D 2270/807* (2013.01); *F05D 2270/821* (2013.01)

(58) Field of Classification Search
CPC ........... F05D 2260/80; F05D 2270/802; F05D 2270/807; F05D 2270/821
See application file for complete search history.

(56) References Cited

U.S. PATENT DOCUMENTS

| | | | | |
|---|---|---|---|---|
| 5,818,242 A * | 10/1998 | Grzybowski | ........... | F01D 21/04 415/14 |
| 7,023,205 B1 | 4/2006 | Krupp | | |
| 7,093,504 B2 | 8/2006 | Southward | | |
| 7,323,868 B2 * | 1/2008 | Mishkevich | ............. | G01B 7/14 324/207.11 |
| 7,409,319 B2 * | 8/2008 | Kant | ........................ | F01D 21/20 73/587 |
| 7,455,495 B2 * | 11/2008 | Leogrande | ............ | F01D 21/003 701/100 |
| 7,582,359 B2 * | 9/2009 | Sabol | .................... | F01D 21/003 702/182 |
| 8,121,813 B2 * | 2/2012 | Ren | ........................ | G01B 7/14 702/155 |
| 8,742,944 B2 * | 6/2014 | Mitchell | ................. | G01K 1/024 340/870.16 |
| 9,709,376 B2 * | 7/2017 | Zhe | ........................ | G01B 7/023 |
| 10,921,109 B2 * | 2/2021 | Iwrey | ........................ | G01B 7/26 |
| 11,156,455 B2 * | 10/2021 | Thimmegowda | ...... | G01B 15/00 |
| 2010/0171491 A1 * | 7/2010 | Chana | ....................... | G01B 7/14 415/118 |
| 2013/0243577 A1 * | 9/2013 | Chana | ....................... | G01B 7/14 324/207.13 |

FOREIGN PATENT DOCUMENTS

EP          2 213 844 A2    8/2010
WO     WO 2012/080691 A1   6/2012

OTHER PUBLICATIONS

Ma, Hui et al., "A review on dynamic characteristics of blade-casing rubbing," Nonlinear Dynamics, Kluwer, Dordrecht, NL, vol. 84, No. 2, pp. 437-472, Dec. 16, 2015.

European Office Action for Application No. 20757027 dated Oct. 10, 2023.

* cited by examiner

ROTATING MACHINE COMPONENT CLEARANCE SENSING SYSTEMS AND METHODS

CROSS-REFERENCE TO RELATED APPLICATIONS

This application claims the benefit of and priority to U.S. Provisional Patent Application Ser. No. 62/878,018, filed Jul. 24, 2019, the disclosure of which is incorporated herein by reference in its entirety. This application also claims the benefit of and priority to U.S. Provisional Patent Application Ser. No. 63/041,484, filed Jun. 19, 2020, the disclosure of which is incorporated herein by reference in its entirety.

TECHNICAL FIELD

The subject matter disclosed herein relates to methods and systems for measuring a clearance between a rotating machine component and one or more sensor units.

BACKGROUND

Turbomachinery, like aviation gas turbines, operate at high speed and with small clearances between the tip of the turbine or compressor blade and the engine case. Typically, there is a direct relationship between engine efficiency and tip clearance in the compressor and turbine stages, with efficiency increasing as clearance decreases. There are several factors cause the clearance to vary during operation: thermal growth, centrifugal loading, wear, and vibration. Due to the complexity of these factors, an accurate measure of clearance is essential to controlling small clearances. While numerous technologies have been proposed historically, including those based on magnetic fields, eddy currents, capacitance measurements, and optical approaches, there is still a lack of a robust sensing solution that can account for the complexities and harsh environment seen in gas turbine engines.

SUMMARY

This disclosure herein relates to monitoring clearance between a rotating machines casing and a blade or other rotating machine part. A system uses a magnet and coil(s) that are magnetically coupled to a region traversed by an electrically conductive machine part (target or blade). In non-ferrous targets, as the target passes through the magnetic field created by the sensor, eddy currents are induced in the target and generate a voltage waveform in the sensor coil(s). Such sensors are sometimes referred to as Eddy Current Sensors or Passive Eddy Current Sensors.

More specifically, the system uses waveform information to determine clearance or gap between the sensor and the target. This includes 2 or more sensing coils that produce voltage waveforms. The sensor is designed so that the distance between the peak magnetic field flux densities changes deterministically with distance away from the sensor. Consequently, timing between the voltage waveforms deterministically changes with distance away from the sensor. This timing information can then be used to as a measure of gap (clearance). Furthermore, the timing information can be used in conjunction with more traditional measures such as speed, temperature, waveform amplitude and slope to form a robust measurement which is less sensitive to variations in target properties and operating conditions.

In some aspects, a sensor system includes a blade tip-shaped sensor oriented to detect the blade tip as the blade tip rotates past the blade tip-shaped sensor.

In other aspects, the system includes a sensor processing unit. The sensor processing unit includes a signal processing circuit configured for receiving and conditioning a sensor signal from the sensor. The signal processing unit includes an analog-to-digital converter configured for converting the sensor signal from the sensor into a digital waveform. The signal processing unit comprises a digital processing unit such as a microcontroller or FPGA configured for determining, based on the digital waveform, a distance between the blade tip and the casing.

The other aspect of this invention is the ability to measure the amount of wear on the abradable layer in a gas turbine engine (sometimes called the wear ring). This is important since the measurement of most interest for the efficient operation of the engine is the clearance between the blade tip and the inner surface of the abradable layer. In this invention, there are two proposed methods for detecting the amount of wear on the abradable layer 1) measure the electrical impedance of a coil which is proximate to the abradable layer, 2) measure the acceleration at or local to the blade clearance sensor to detect a rub event. With either method, this information feeds back to the clearance monitoring system to adjust the calibration values and thus allowing for a real-time adjustment in the calibration base on wear and/or rub detection.

Systems and methods for measuring a clearance between a rotating machine component (such as a compressor or turbine blade) and a sensor unit are disclosed. In some aspects, a system includes a sensor unit oriented to detect the rotating machine component as the rotating machine component rotates past the sensor unit, the sensor unit including at least a first sensing element and a second sensing element spaced apart from the first sensing element. The system includes a sensor processing unit in electrical communication with the sensor unit. The sensor processing unit is configured for receiving a first waveform from the first sensing element; receiving a second waveform from the second sensing element; and determining, based on a comparison between the first waveform and the second waveform, a distance between the rotating machine component and the sensor unit.

In some aspects, a system for measuring a clearance between a rotating machine component and a casing of the rotating machine includes a sensor unit oriented to detect the rotating machine component as the rotating machine component rotates past the sensor unit. The system includes a sensor processing unit in electrical communication with the sensor unit and configured for: determining a thickness of an abradable layer of the casing; determining a distance between the rotating machine component and the sensor unit; and determining the clearance based on the thickness of the abradable layer and the distance between the rotating machine component and the sensor unit.

DETAILED DESCRIPTION

This disclosure herein describes systems and methods for measuring a clearance between a rotating machine component and a sensor unit. The clearance can be between a blade tip and a casing, for example, in turbomachinery, such as aviation gas turbines; however, in general, the systems and methods can be used with any appropriate type of rotating machinery. The systems can use a combination of electromagnetic sensors and a high speed processing unit such as a microcontroller or FPGA to extract clearance data.

Compared to some capacitive type sensors, the systems disclosed herein have an advantage in not needing line-of-sight to the blade tip, and the medium in between the sensor and blade tip does not affect the sensor output. Compared to some active magnetic type sensors, the systems disclosed herein have an advantage in that it is significantly less complex to drive and read the sensor.

Figure 1:
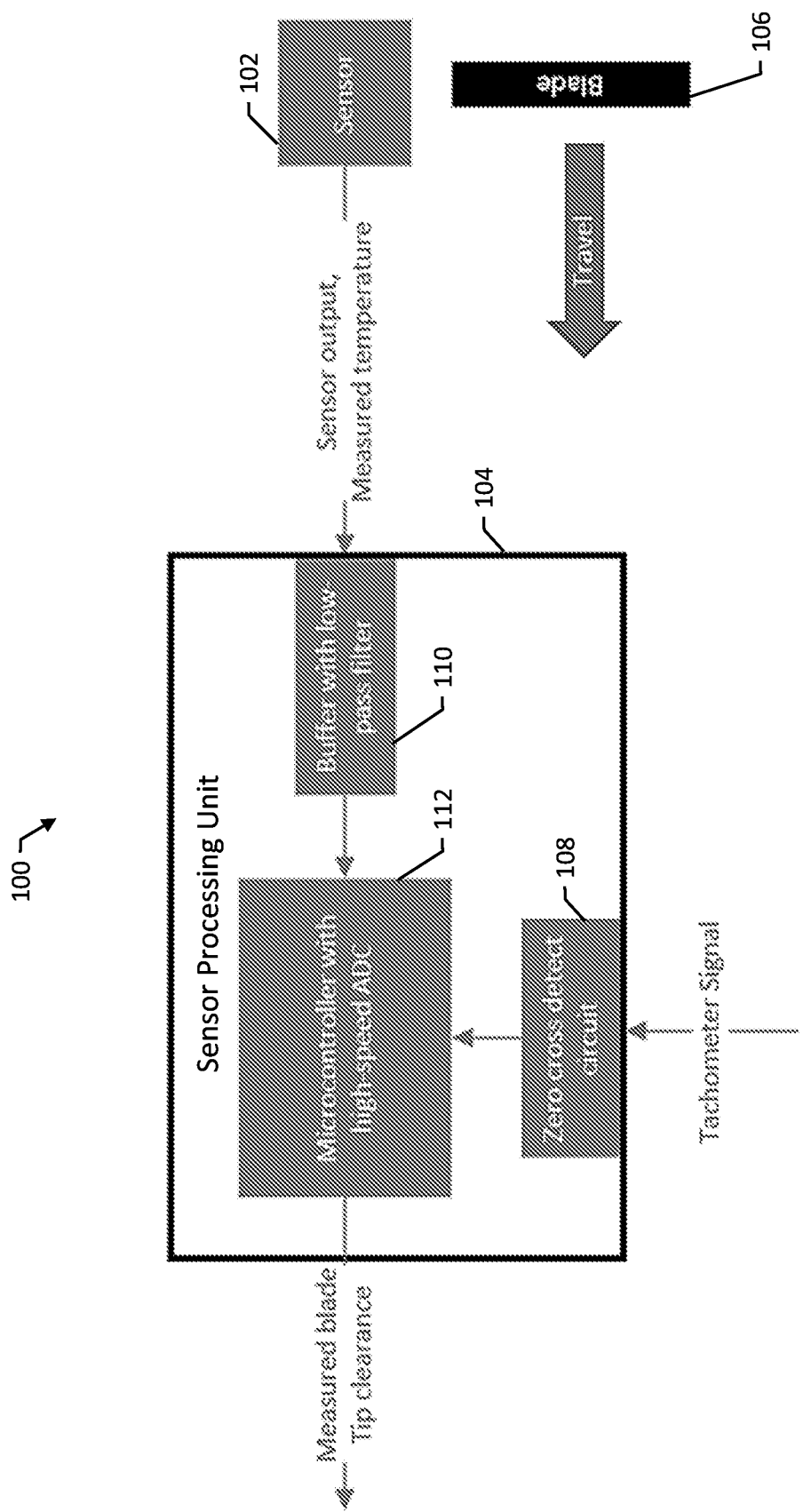
FIG. 1 shows an example system for measuring a clearance between a blade tip and a casing.

FIG. 1 shows an example system 100 for measuring a clearance between a blade tip 106 and a casing. The system 100 includes a sensor 102 and a sensor processing unit 104. The sensor processing unit 104 includes signal conditioning electronics and a processing unit 112 (e.g., a microcontroller) with a high-speed analog-to-digital converter for measuring the sensor's output voltage. The sensor processing unit 104 also optionally includes an input for a 1/rev tachometer sensor to measure machine speed and keep track of individual blades.

Referring to FIG. 1, sensor signals are conditioned by the signal conditioning electronics as it enters the sensor processing unit 104. The sensor signals can be conditioned using zero cross detect circuits 108, buffers 110, and filters applied before it is read by the processing unit 112.

The sensor processing unit 104 is configured, e.g., by virtue of appropriate selection of sub-components, to sample the waveform at sufficiently high speed to measure the appropriate waveform characteristics. For turbomachinery, this sample rate can be very high, and in some examples the sample rate is 2 MS/sec or greater.

In order to remove unwanted frequency content from the sensor signal, the sensor processing unit 104 may use digital tracking bandpass filters which can adapt the corner frequencies to the pass frequency of the sensed elements. The sensor signal may also contain frequency content below that of the blade pass frequency, which may be band pass filtered and used to calculate other engine parameters such as shaft motion.

Figure 2:
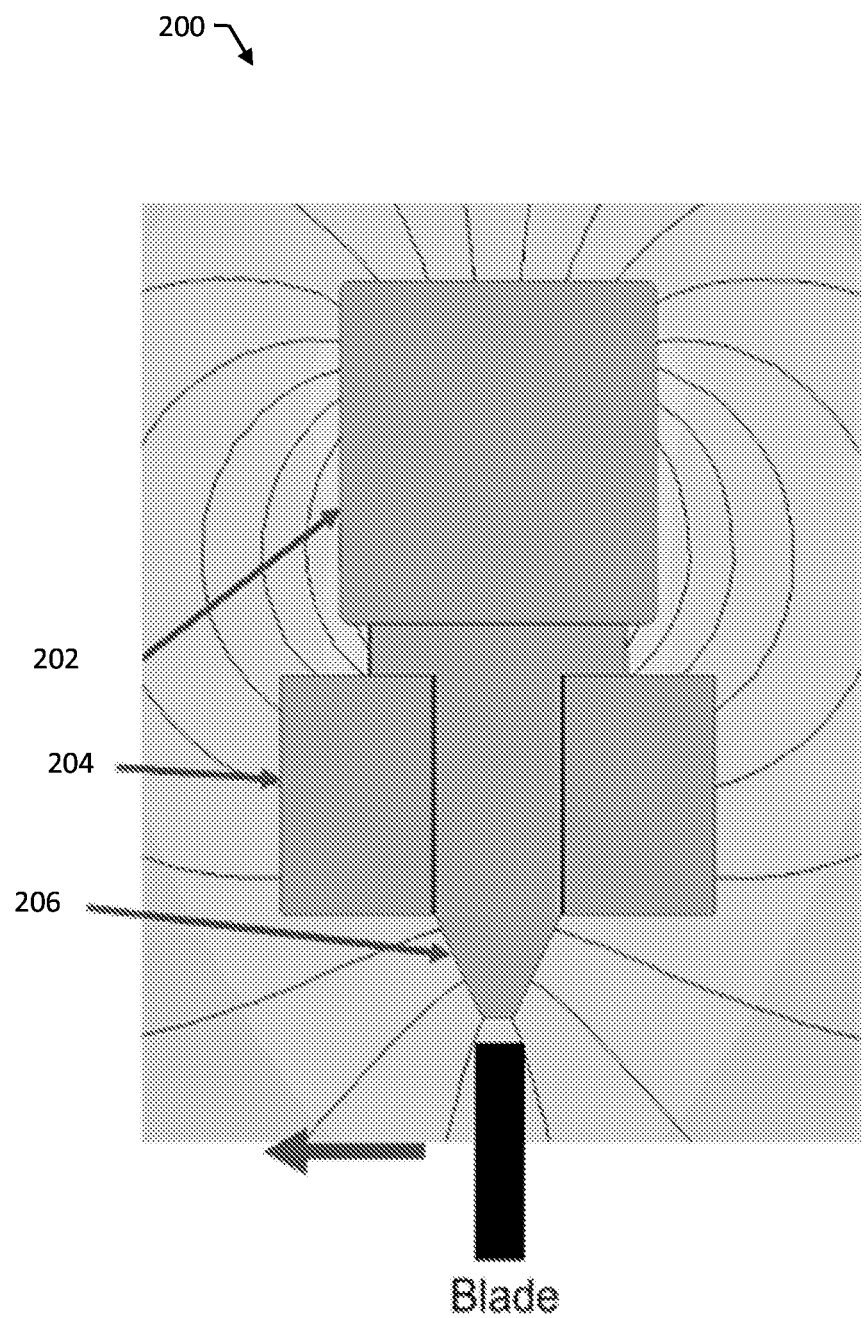
FIG. 2 is a cross-sectional view of an example blade tip-shaped sensor.

FIG. 2 is a cross-sectional view of an example blade tip-shaped sensor 200. The sensor 200 includes a permanent magnet 202, a pole piece 206, and a sensing coil 204. The pole piece 206 is a member made of a magnetically soft material. The sensor 200 is blade tip-shaped in that the cross section of the pole piece 206 follows the blade tip geometry when viewed in the engine's radial direction (looking down at the top of the blade tip). The sensor 200 is oriented such that when the blade passes the sensor 200, the shared cross-sectional area is maximized.

Figure 5:
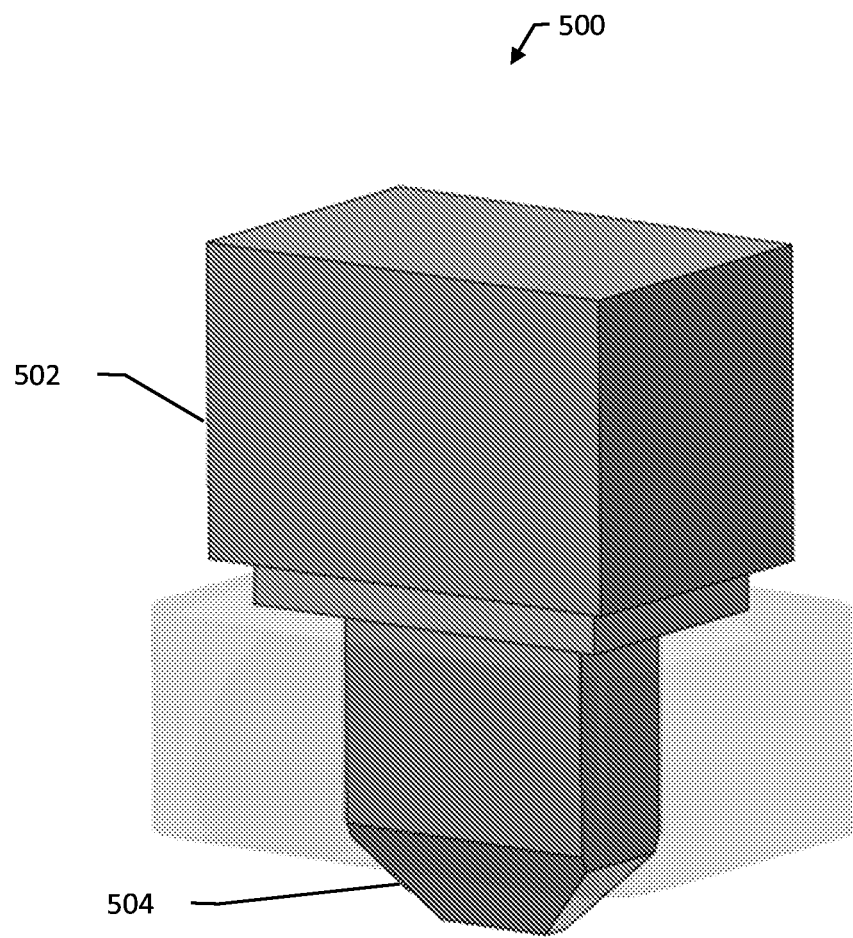
FIG. 5 shows an example of a blade tip-shaped sensor.

FIG. 5 also shows an example of a blade tip-shaped sensor 500. The sensor 500 includes a magnet 502 and a pole piece 504. In the case of gas turbine engines, the targets are rotating blades. These blades can vary significantly in size, shape, and material at the various stages of the engine and from engine to engine. When the blades are long and thin in shape, a custom magnetic circuit can be utilized to maximize the output signal and thereby improve signal to noise characteristics.

Figure 6:
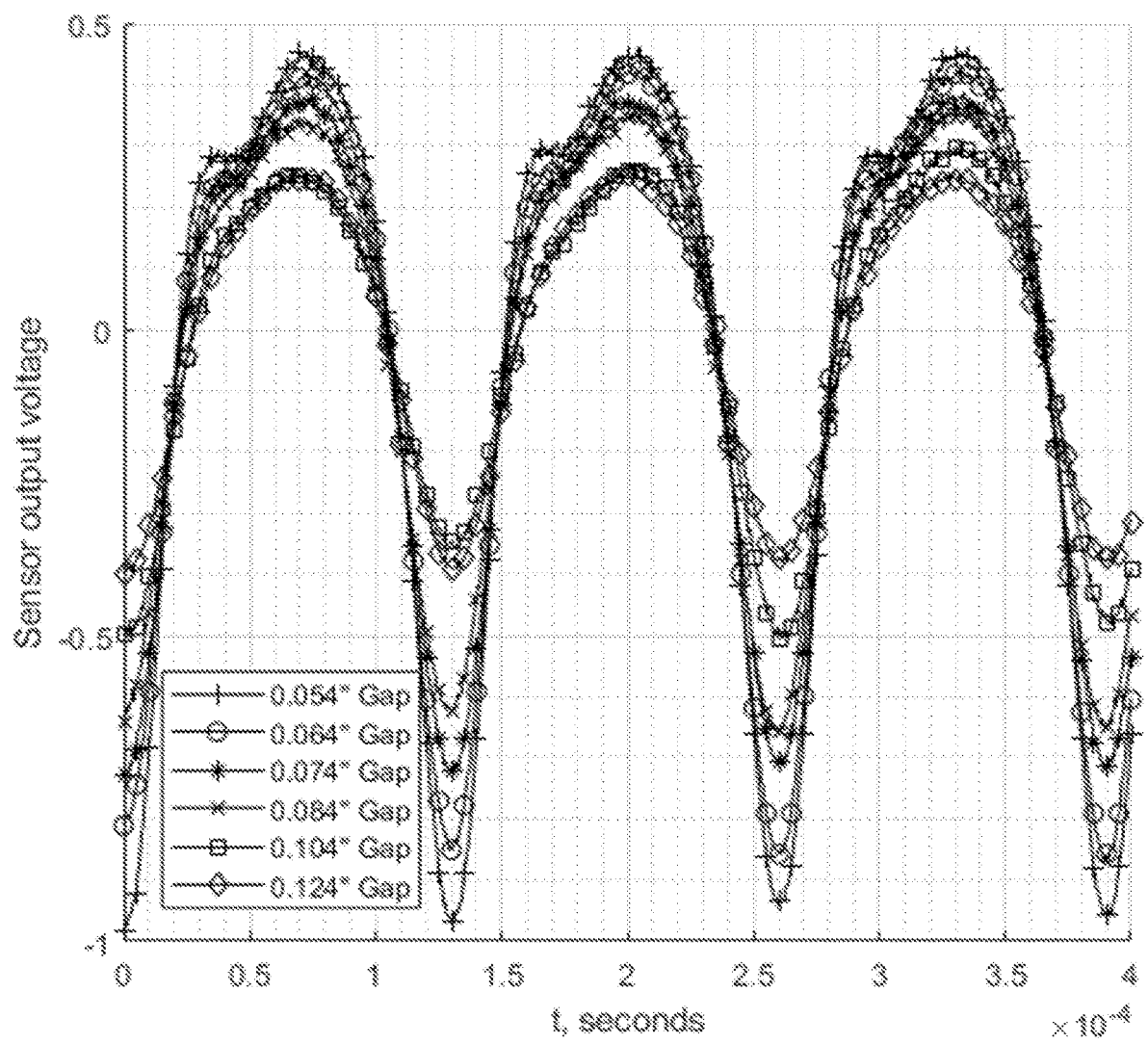
FIG. 6 is graph showing, for an example system, output waveforms from the sensor for various gap distances between the blade tip and the sensor.
Figure 7:
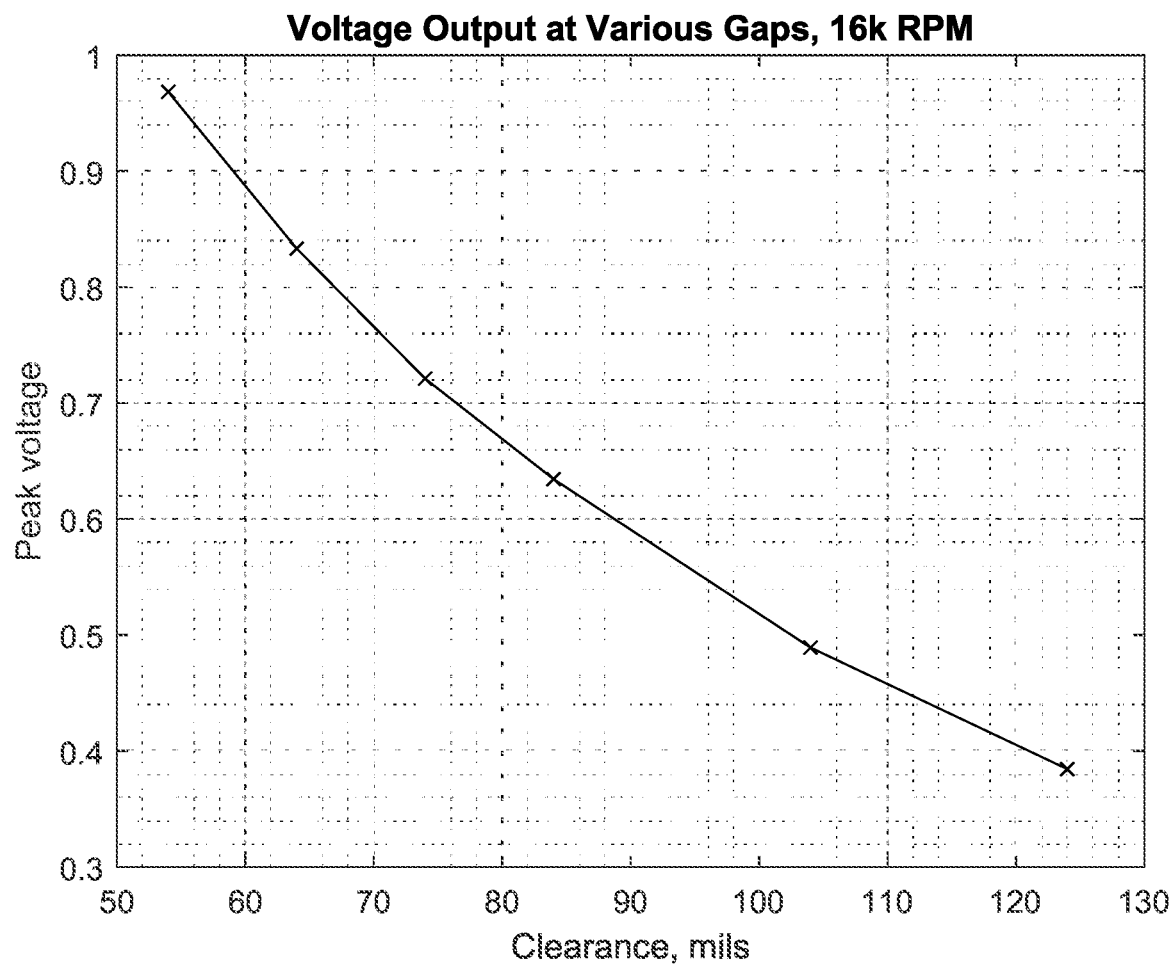
FIG. 7 is a graph showing, for an example system, the peak voltage from a detected waveform versus the measured clearance.

The sensor is blade tip-shaped in that the sensor pole is blade tip-shaped, e.g., the sensor pole has a rectangular body. The sensor is oriented such that when the blade passes the sensor, the shared cross-section area is maximized to maximize the output voltage. FIGS. 6 and 7 are graphs of representative waveforms and peak voltage vs gap relationships.

In some examples, the maximum size of the sensor is determined by end-application space constraints and minimum acceptable signal amplitude. If the end application of the sensor is to be a high-temperature environment, high temperature materials can be used to form the sensor. For applications approaching 900° F., a high-temperature magnet such as AlNiCo may be used, as well as ceramic coated magnet wire.

In other embodiments, an electromagnet with a constant or varying current source can be used in place of the permanent magnet or to augment the permanent magnet. This has the benefit of a high temperature rating and producing a known magnetic field amplitude which is independent of temperature.

The system can measure the temperature of the sensor using any appropriate technique. In some examples, the system includes a temperature sensor included in the sensor itself. An alternative approach would be to measure the resistance of the coil(s) in operation.

Sensor and blade temperatures may be estimated from a gas path temperature provided to the sensor processing unit from the engine controller, or vice versa.

The blade temperature can also be estimated using a model and measured inputs such as sensor temperature, rotational speed, and nominal clearance.

Figure 3:
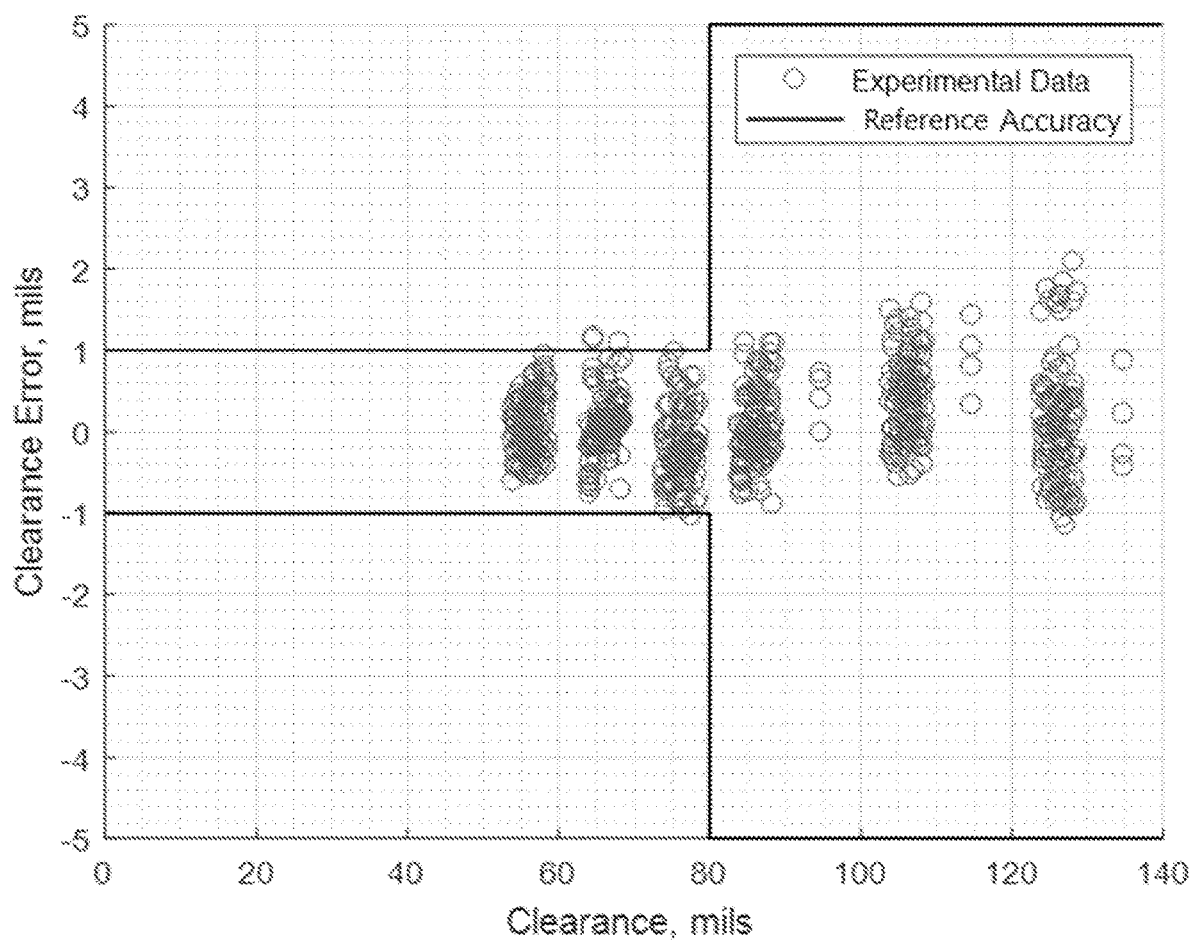
FIG. 3 is a chart illustrating measured clearance values from a test system.

FIG. 3 is a chart illustrating measured clearance values from a test system. On the test system, the clearance measurement system was able to distinguish blade clearance to within ~0.001" at low clearances.

Figure 4:
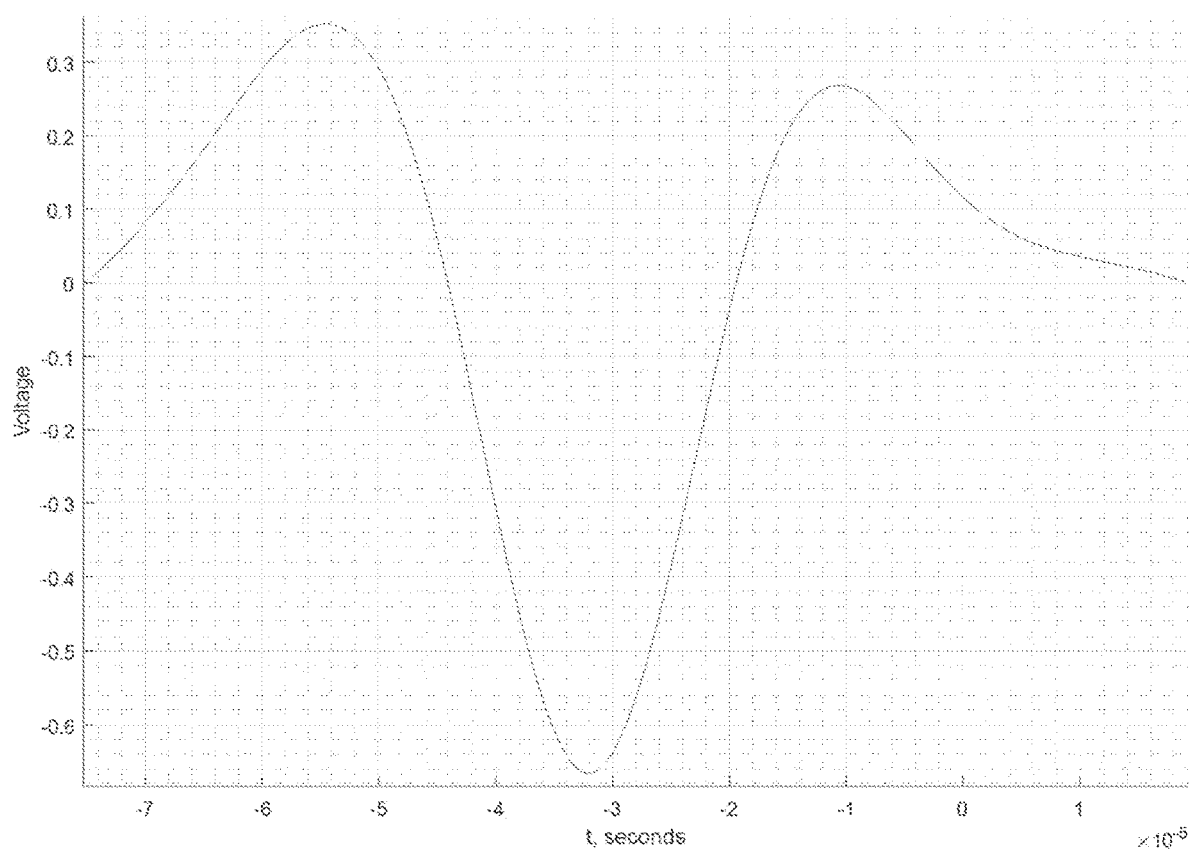
FIG. 4 is a chart showing an example waveform from one blade pass.

FIG. 4 is a chart showing an example waveform from one blade pass. The waveform is a time series of voltage values from the sensor.

FIG. 6 is graph showing, for an example system, output waveforms from the sensor for various gap distances between the blade tip and the sensor. The horizontal axis shows time and the vertical axis plots the sensor output voltage. Since the waveforms each have different peak output voltages, the system can determine the gap distance, e.g., by measuring the peak voltage from a detected waveform and correlating the gap distance to the peak voltage.

FIG. 7 is a graph showing, for an example system, the peak voltage from a detected waveform versus the measured clearance. When this relationship is known, the system can determine the clearance by measuring the peak voltage from the detected waveform.

In an alternate method, the distance between the sensor and the blade tip can be measured using a timing-based sensing method, based on a timing difference between signals of two or more sensing elements. The sensor is configured such that the timing between the two or more signals changes deterministically as the distance between the sensor and blade changes.

Figure 8A:
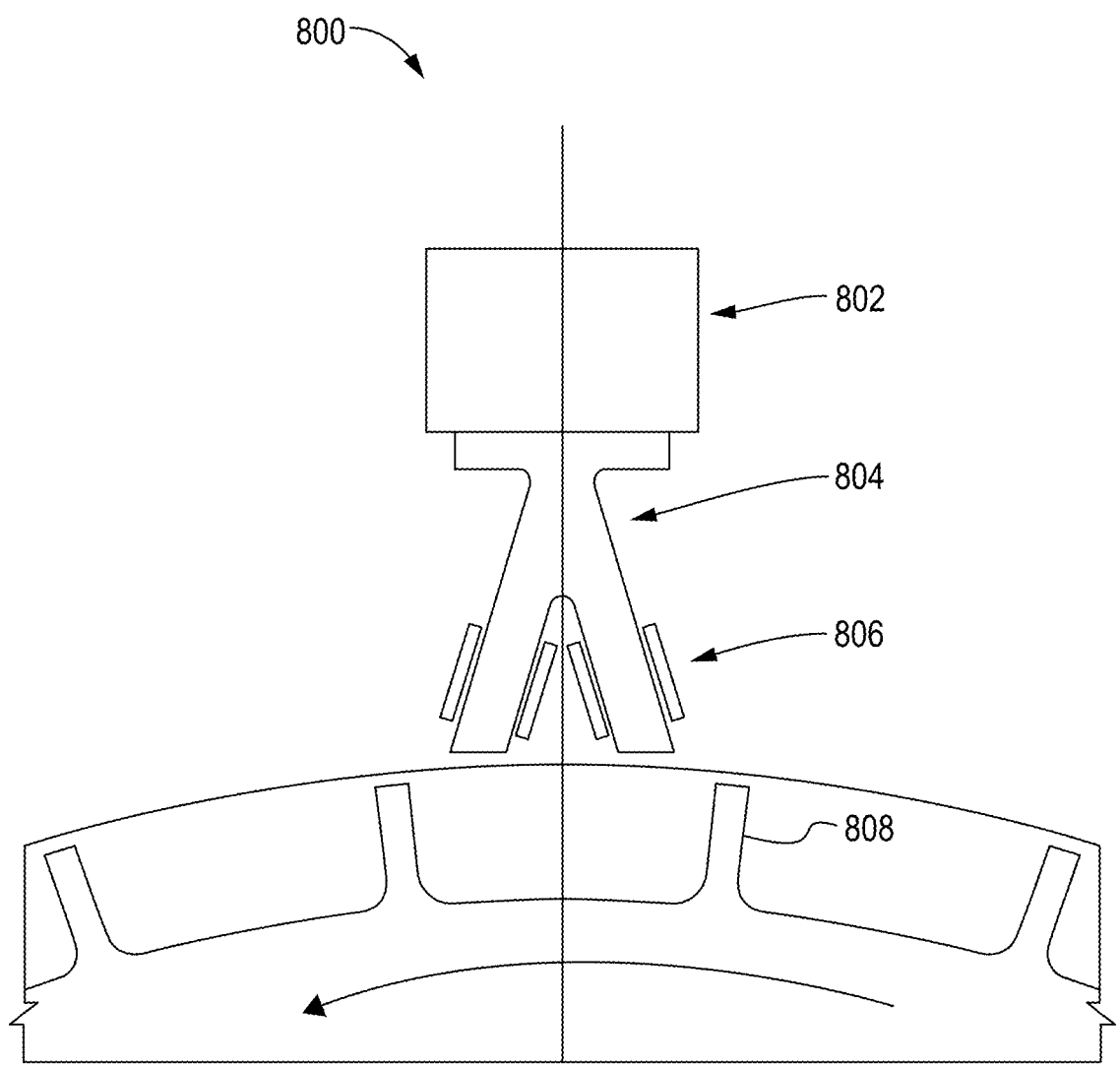
FIG. 8A shows an example of a sensor that can be used for the timing-based sensing method.
Figure 8B:
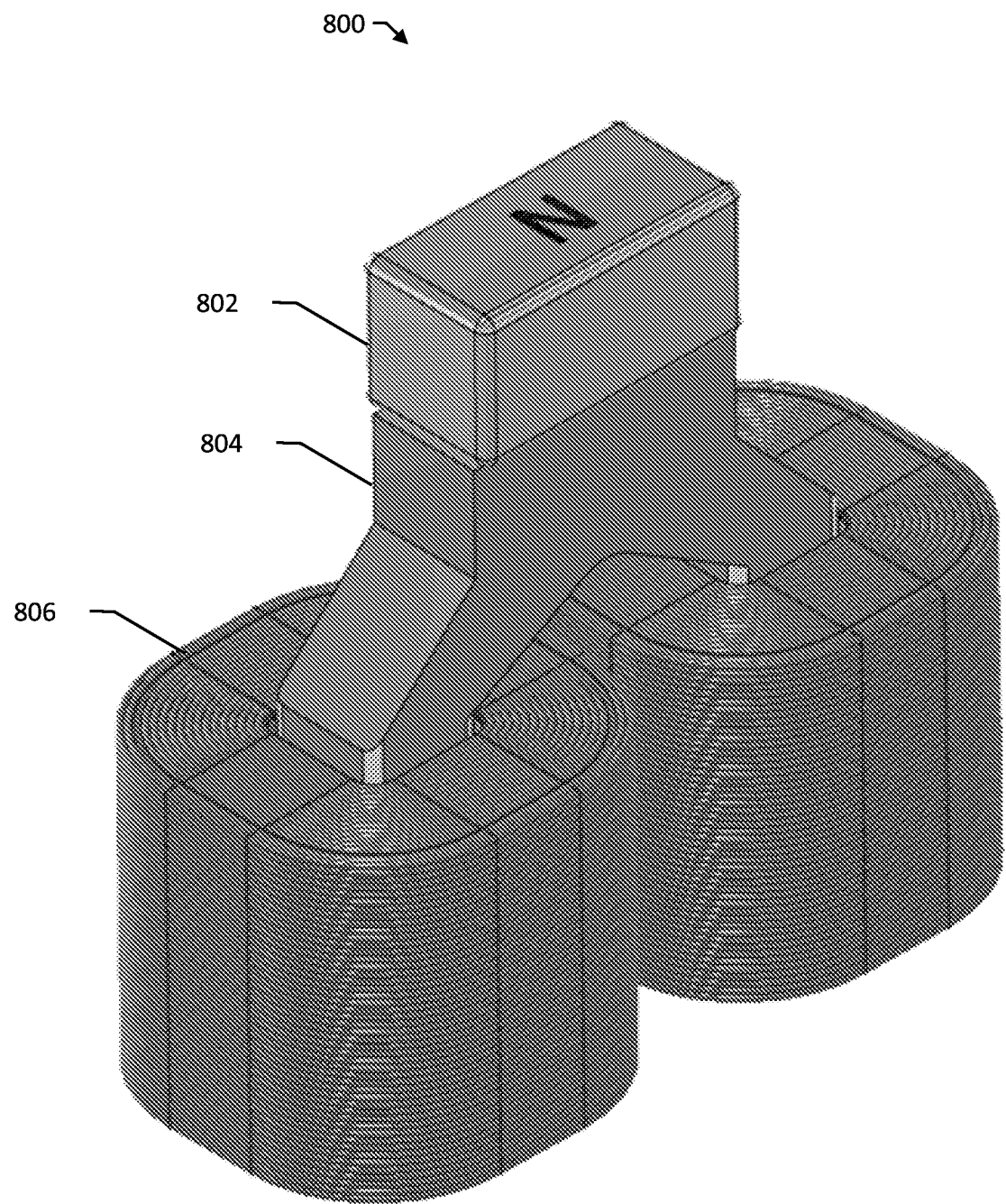
FIG. 8B shows a three dimensional view of the sensor.

FIG. 8A shows an example of a sensor 800 that can be used for the timing-based sensing method. The sensor includes a magnet 802, a split pole piece 804 in a "Y" shape, and windings 806 around leading and trailing sensing elements of the split pole piece. The sensor 800 is oriented to detect targets, e.g., target 808. FIG. 8B shows a three dimensional view of the sensor 800.

Figure 9:
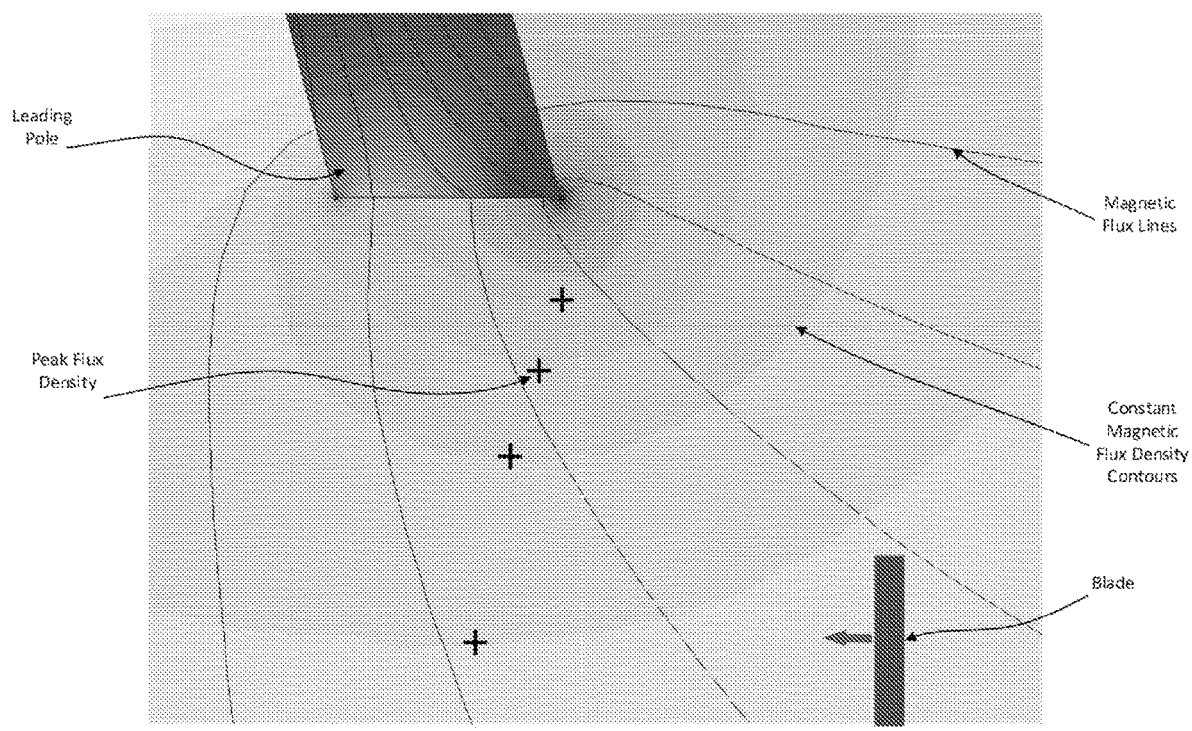
FIG. 9 depicts the flux density around the leading pole piece of the sensor.

FIG. 9 depicts the flux density around the leading pole piece of the sensor shown in FIG. 8A. Peak magnetic flux density shifts horizontally as the distance between the blade and the sensor increases. In the plot shown in FIG. 9, the location of peak flux density for the leading sensing element is indicated by a "+" marker. The trailing sensing element exhibits the same relationship, albeit mirrored about the sensor's vertical centerline.

Figure 10:
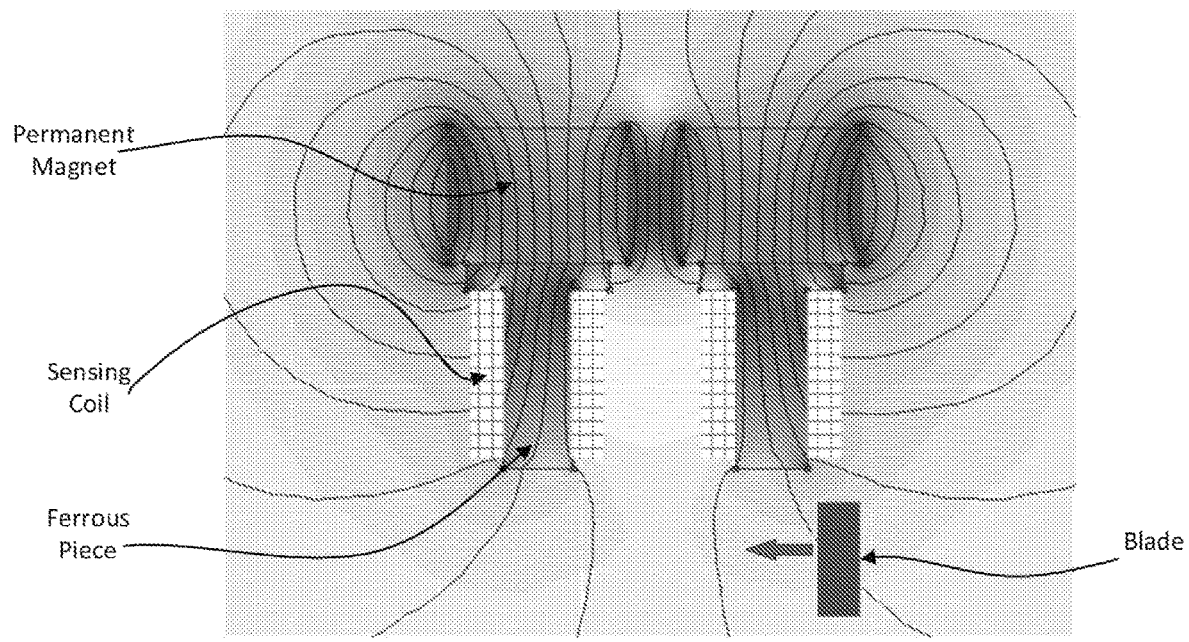
FIG. 10 shows an example sensor system including two electromagnetic sensors in close proximity.
Figure 11:
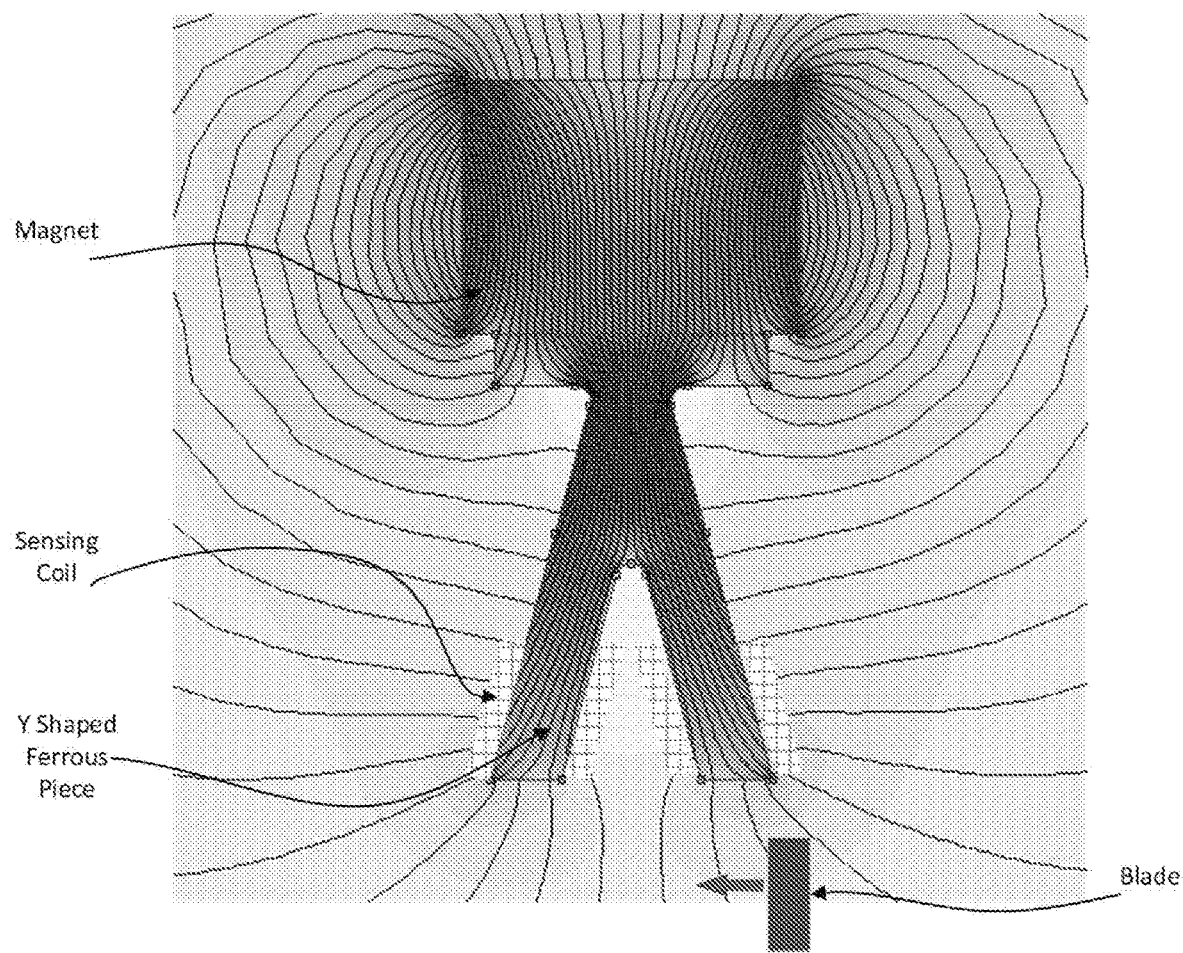
FIG. 11 shows another example sensor system, where the ferrous piece or pole piece is split into leading and trailing poles and there is only a single magnet.
Figure 12:
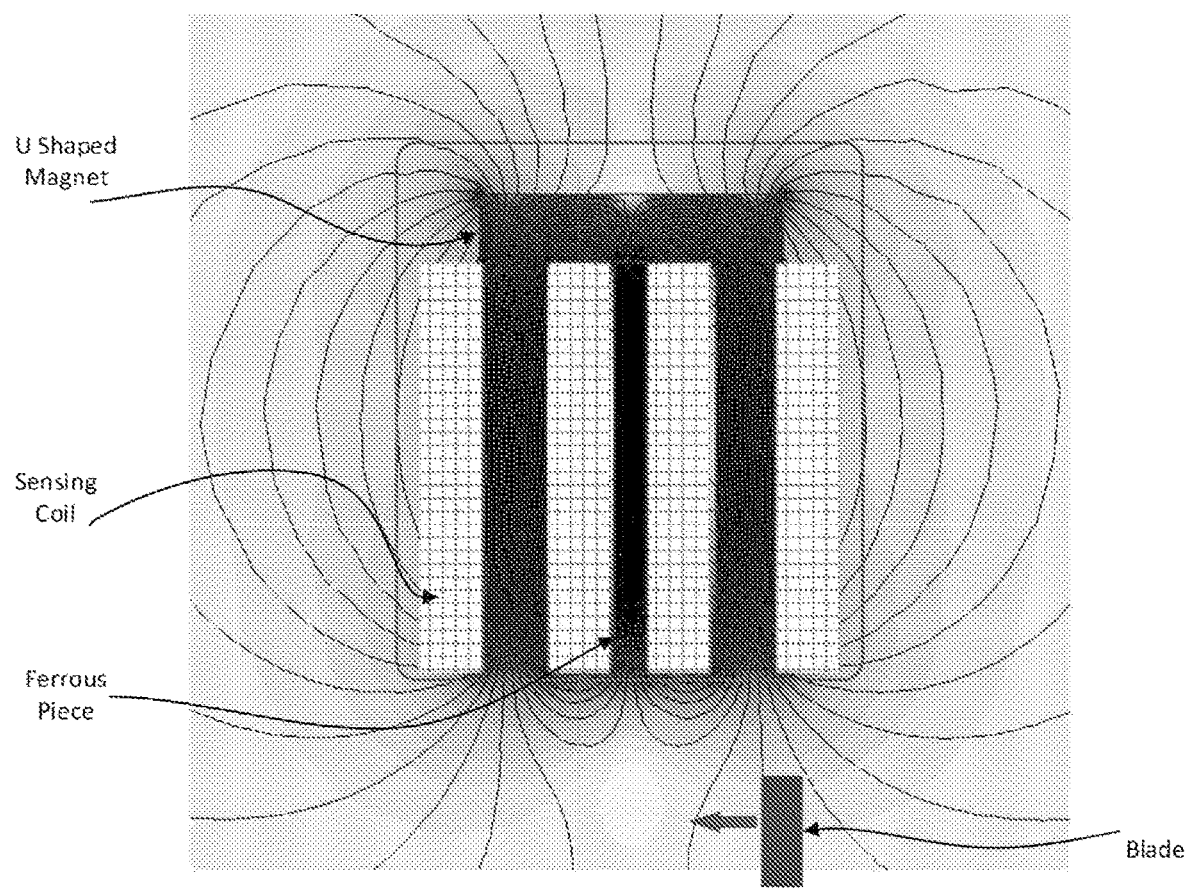
FIG. 12 shows another example sensor system, where the magnet is split or shaped like a U and there is a single pole piece in the center.

The timing-based sensing method can be implemented using any appropriate sensor having at least two sensing elements. FIGS. 10, 11, and 12 illustrate example sensors.

FIG. 10 shows an example sensor system including two electromagnetic sensors in close proximity FIG. 11 shows another example sensor system, where the ferrous piece or pole piece is split into leading and trailing poles and there is only a single magnet. FIG. 12 shows another example sensor system, where the magnet is split or shaped like a U and there is a single pole piece in the center.

Figure 13:
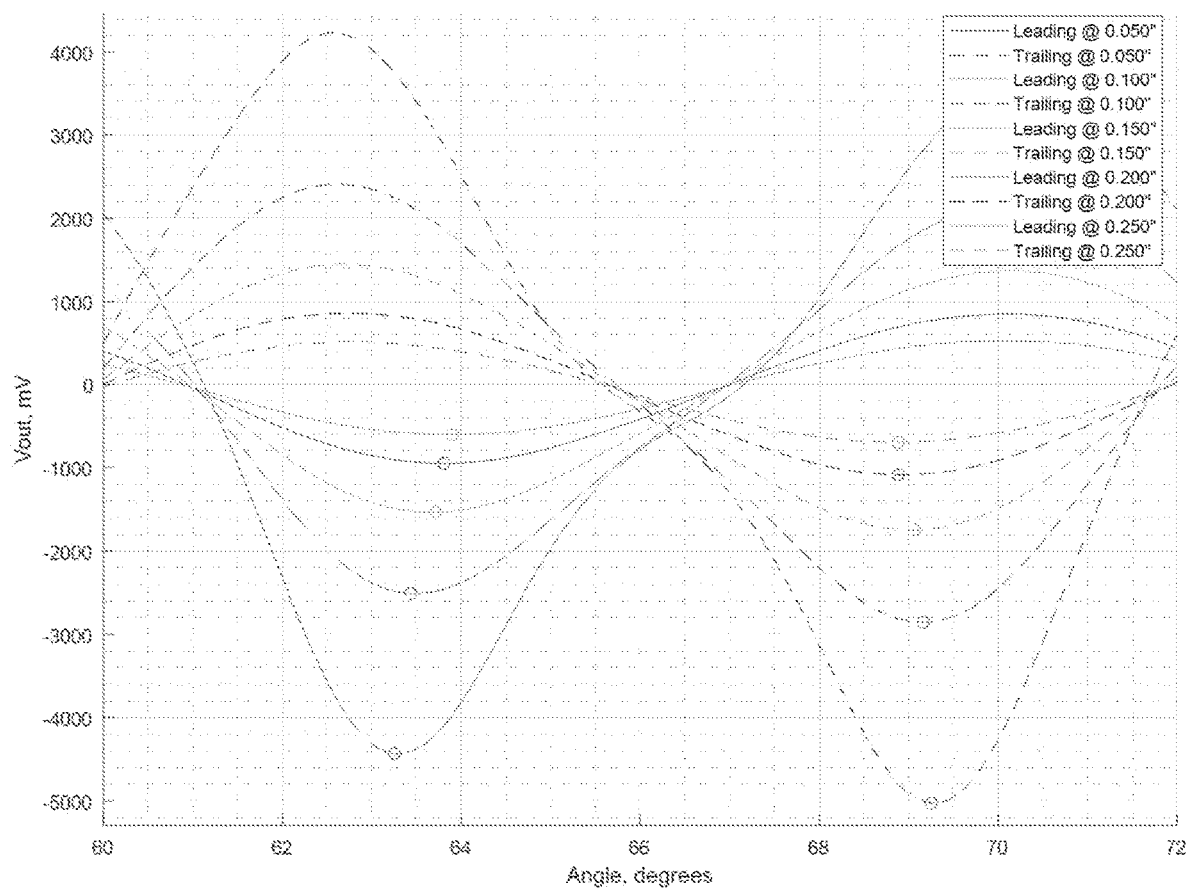
FIG. 13 is a graph showing output waveforms from leading and trailing sensing elements versus angle.

The configurations and magnetic field geometries shown in FIGS. 10, 11, and 12 result in the qualitative relationships demonstrated in the waveforms shown in FIG. 13. FIG. 13 is a graph showing output waveforms from leading and trailing sensing elements versus rotating machine component angle for the sensor shown in FIG. 8A. The peaks of the sensor waveforms are identified by circles. The temporal (and angular) position of the negative peak voltage for leading and trailing poles grow closer together as clearance increases. This trend follows the aforementioned relationship between peak magnetic flux density and clearance. In some examples, however, the two waveforms grow farther apart as the gap increases.

Figure 14:
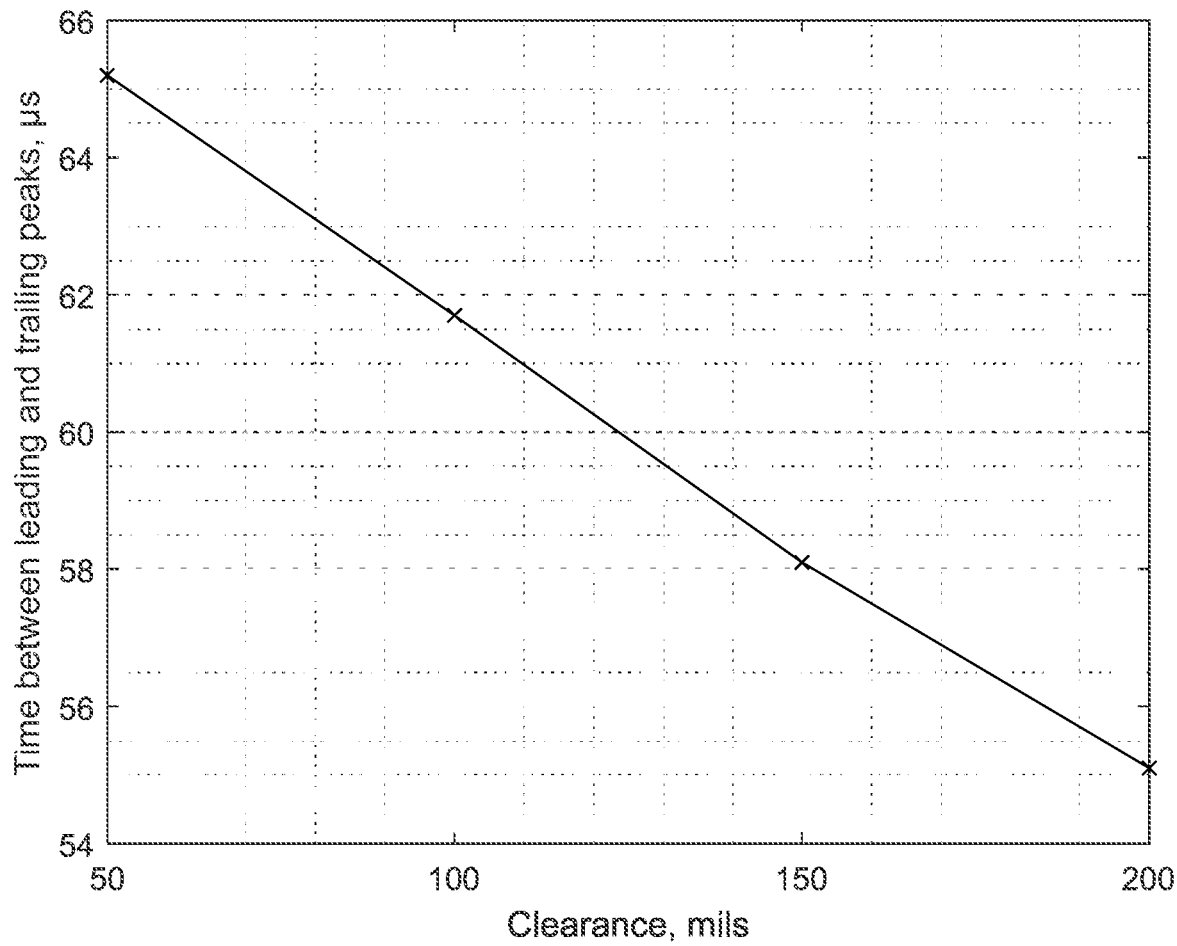
FIG. 14 is a graph of the time between leading and trailing peaks versus clearance.

In FIG. 14, an exemplary relationship between delta time (timing difference between the two waveforms) and clearance shows a predominantly linear behavior in the sensing region of interest. In this case between 50 and 200 mils of clearance. FIG. 14 shows output waveforms of the sensor in FIG. 8A from the leading and trailing peaks versus clearance. In this example the sensitivity is 70 nanoseconds per mil, which converts to 14 clock cycles per mil if sampled using a 200 MHz microcontroller.

Furthermore, the relationship between delta time and clearance is largely insensitive to variations that occur during normal operation such as changes in temperature and blade wear. Consequently, the delta time can be used as a more robust measure of clearance.

Figure 15:
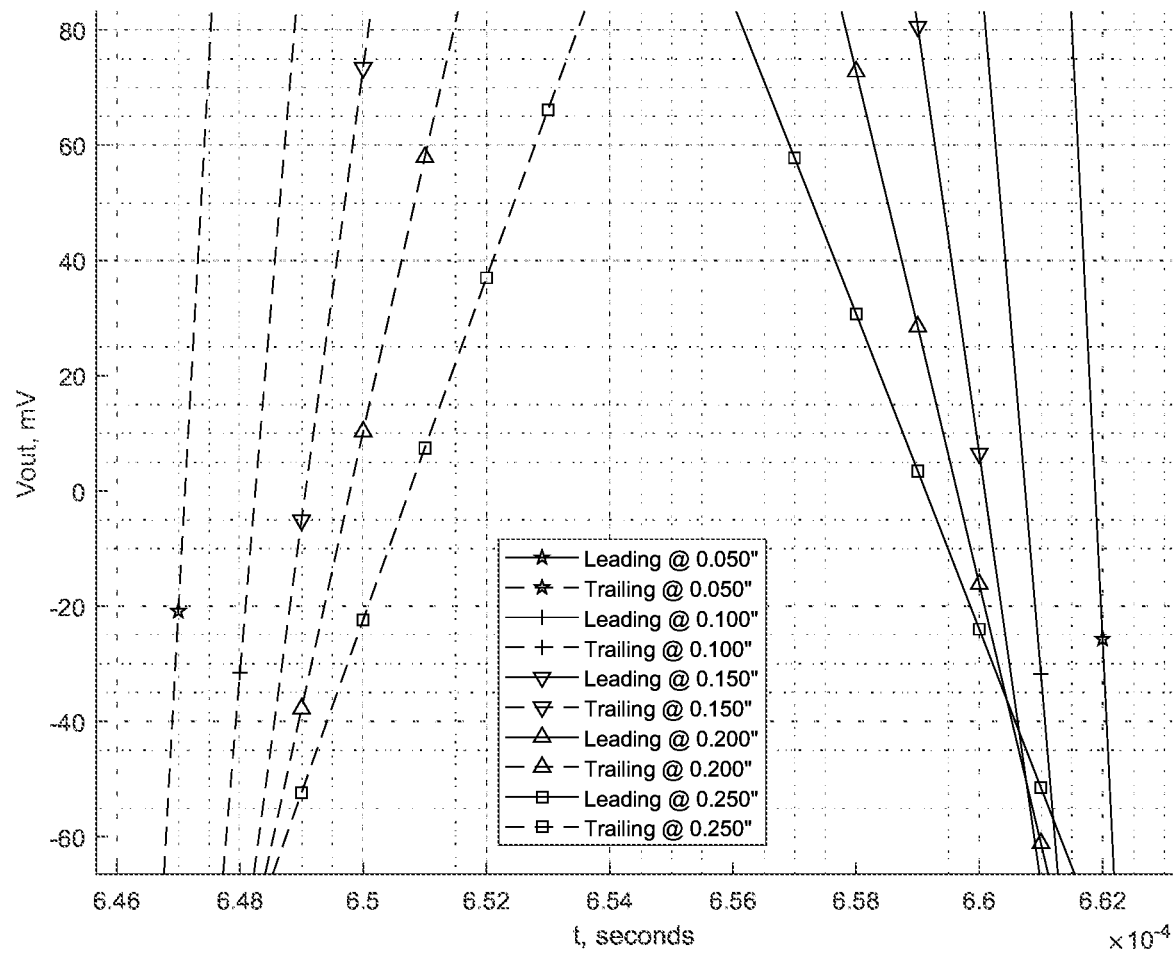
FIG. 15 shows, for an example system, output voltages from leading and trailing sensing elements versus time for various gap distances.

In another example, the zero-cross timing between the leading and trailing waveforms can be used to determine the gap. FIG. 15 shows, for an example system, output voltages from leading and trailing sensing elements versus time for various gap distances. The system, which can be the system shown in FIG. 8A, can determine a timing difference from the zero-cross timings and use the timing difference to determine the distance between the sensor and the blade tip.

Figure 16A:
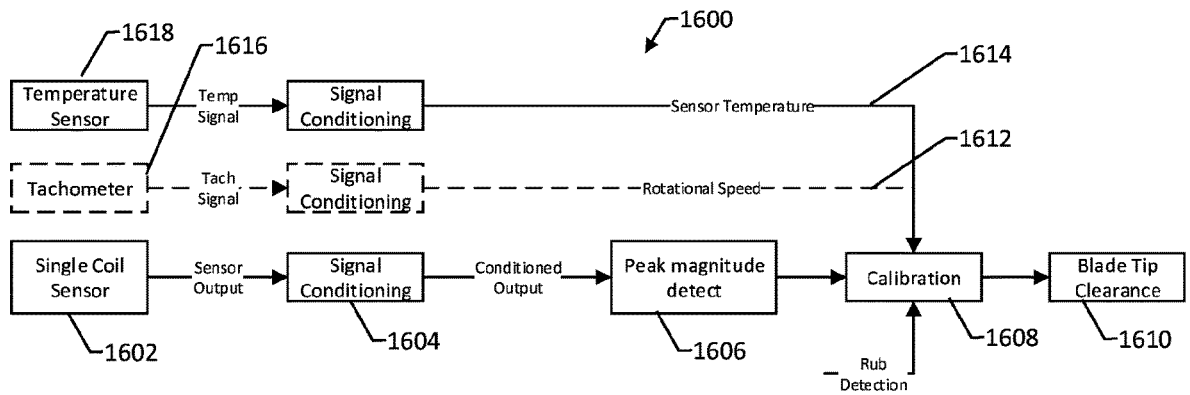
FIGS. 16A and 16B are block diagrams illustrating signal processing paths.
Figure 16B:
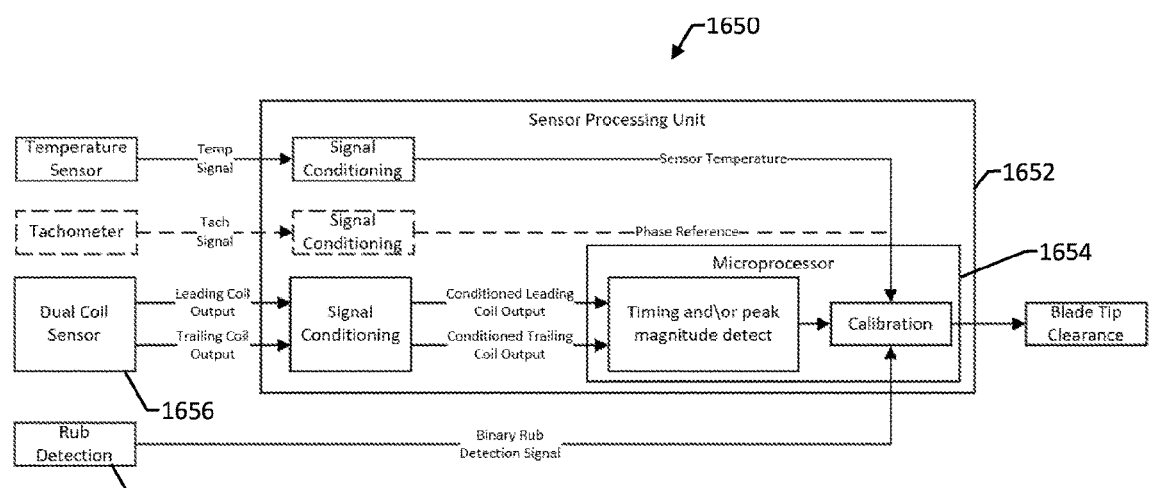

FIGS. 16A and 16B are block diagrams illustrating signal processing paths. FIG. 16A illustrates an example signal processing path 1600 for an amplitude-based clearance measurement. FIG. 16B illustrates an example signal processing path 1650 for a timing-based clearance measurement.

As shown in FIG. 16A, the sensor output from a sensor system having a single sensing element 1602 is passed through a signal conditioning circuit 1604, and the conditioned output is used to detect a peak magnitude 1606. The peak magnitude in conjunction with rotational speed 1612 (e.g., from a tachometer 1616) and sensor temperature 1614 (e.g., from temperature sensor 1618) can then be calibrated 1608 and used to determine a clearance 1610.

As shown in FIG. 16B, the sensor outputs from a sensor system 1656 having leading and trailing sensing elements are passed through a signal conditioning circuit, and the conditioned outputs are used to determining a timing difference or a peak magnitude difference. The timing difference can be calibrated (e.g., using rub detection 1658) and used to determine a clearance. FIG. 16B also illustrates an example hardware structure for implementing the signal processing paths described in this specification. As shown in FIG. 16B, the hardware structure includes a sensor processing unit 1652 and a microprocessor 1654. Any appropriate processing hardware can be used; in some examples, a field programmable gate array (FPGA) or other circuit can be used to accommodate high speed parallel processing.

The calibration process can use, for example, a tachometer signal or a temperature signal or both. An abradable thickness and/or rub indication can feed into a digital calibration function in the processing unit. The calibration circuit will take the rub detected and adjust the calibration parameters in real time to provide a new zero-point reference.

One major complication with blade tip clearance sensor technologies is the presence of the abradable layer (sometimes called the wear ring). This layer is purposefully designed to wear during the life of the engine, in particular during its first few cycles. The measurement of most interest for the efficient operation of the engine is the clearance between the blade tip and the inner surface of the abradable layer. In systems where the measurement being made is between the sensor body and the blade tip, the measurement may not account for the moving datum of the abradable layer. The systems described in this specification can be configured to detect the amount of wear on the abradable layer.

Figure 17:
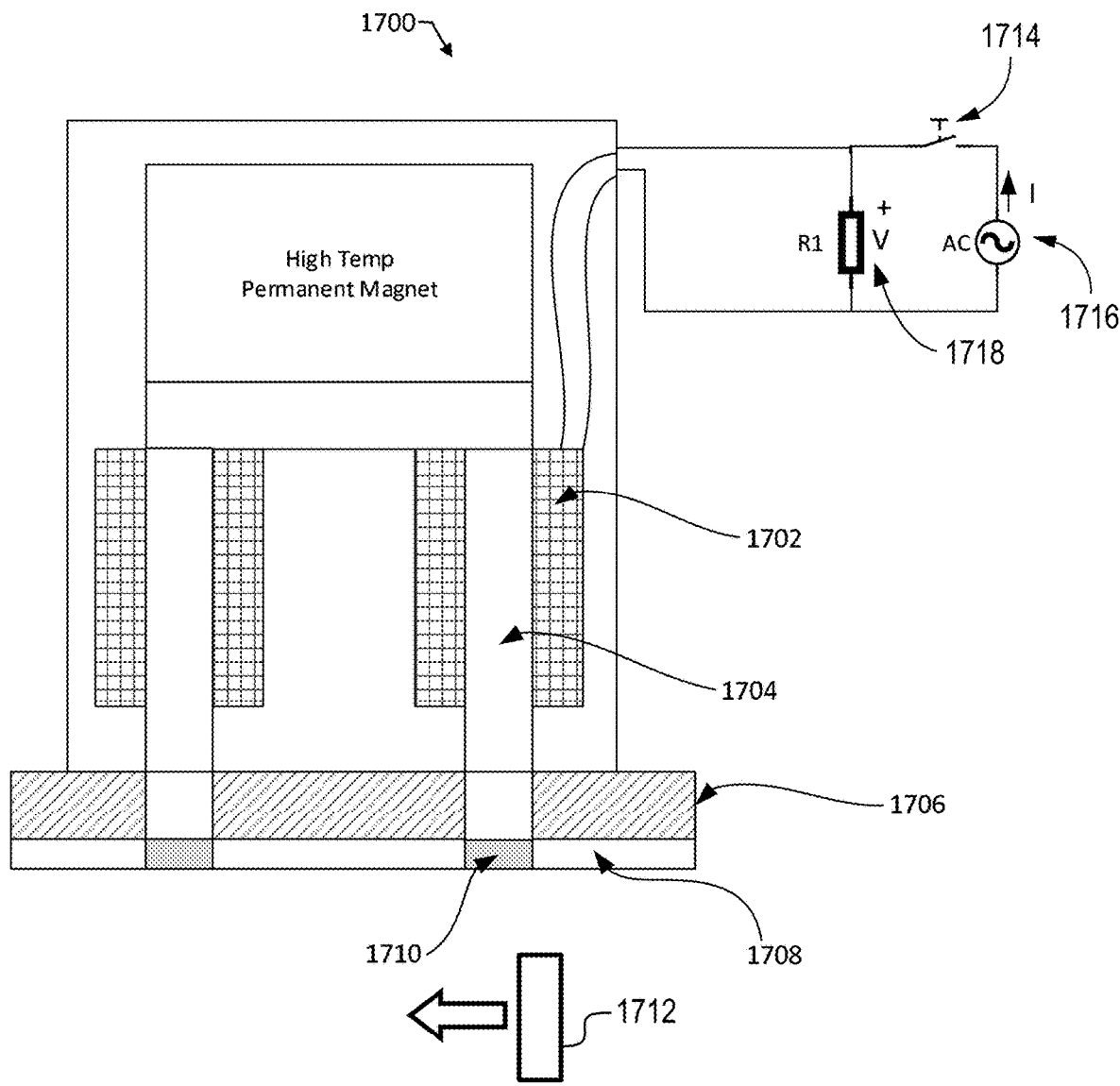
FIG. 17 shows an example for measuring a thickness of the abradable layer.

In a first example of detecting the amount of wear on the abradable layer, the system measures the electrical impedance of a coil which is proximate to the abradable layer. FIG. 17 shows an example system 1700 for measuring a thickness of the abradable layer. The system 1700 includes a coil 1702 and a magnetic pole 1704. FIG. 17 shows the engine case 1706, a conductive or non-conductive abradable 1708, the electrically conductive abradable plug 1710, and the blade 1712. A circuit includes a disconnect switch 1714, an alternating current source 1716, and a voltage measurement circuit 1718.

The electrical impedance of the abradable can be measured by driving an AC carrier frequency into one or more coils. The resulting voltage and or current can be measured to extract the electrical impedance at that carrier frequency. The impedance is affected by the electromagnetic properties and thickness of the abradable. As the abradable wears, the impedance signature will change allowing for detection of wear due to rub or the harsh environment.

FIG. 17 also shows a switch 1714 representing the ability to turn on or off the excitation frequency to the coil. In some applications, the excitation may only be desired at determined times, such as when the blade is close to the abradable.

In FIG. 17, this is shown using the same coil that is used to detect the induced eddy currents from the blade passage. In this case, digital filtering can be executed in processing unit to separate the blade passage signal and the AC excitation signal.

Alternatively, separate independent coils could be used to measure impedance changes. In fact, some cases, it may be desirable to have a magnetic circuit measuring the abradable in the blade wear path and a second sensor measuring the abradable at a location outside of the blade wear path. In this configuration, the second sensor serves as a reference comparison for the impedance measurement and will help to cancel out thermal and environmental variation allowing for a more direct measurement of the abradable wear.

In the case where the abradable coating is not electrically conductive, the tip of the magnetic pole (or pin) shown in FIG. 17 can have an electrically conductive abradable plug 1710. The electrically conductive abradable plug 1710 will still maintain good thermal isolation but allow the abradable thickness to be sensed.

Figure 18:
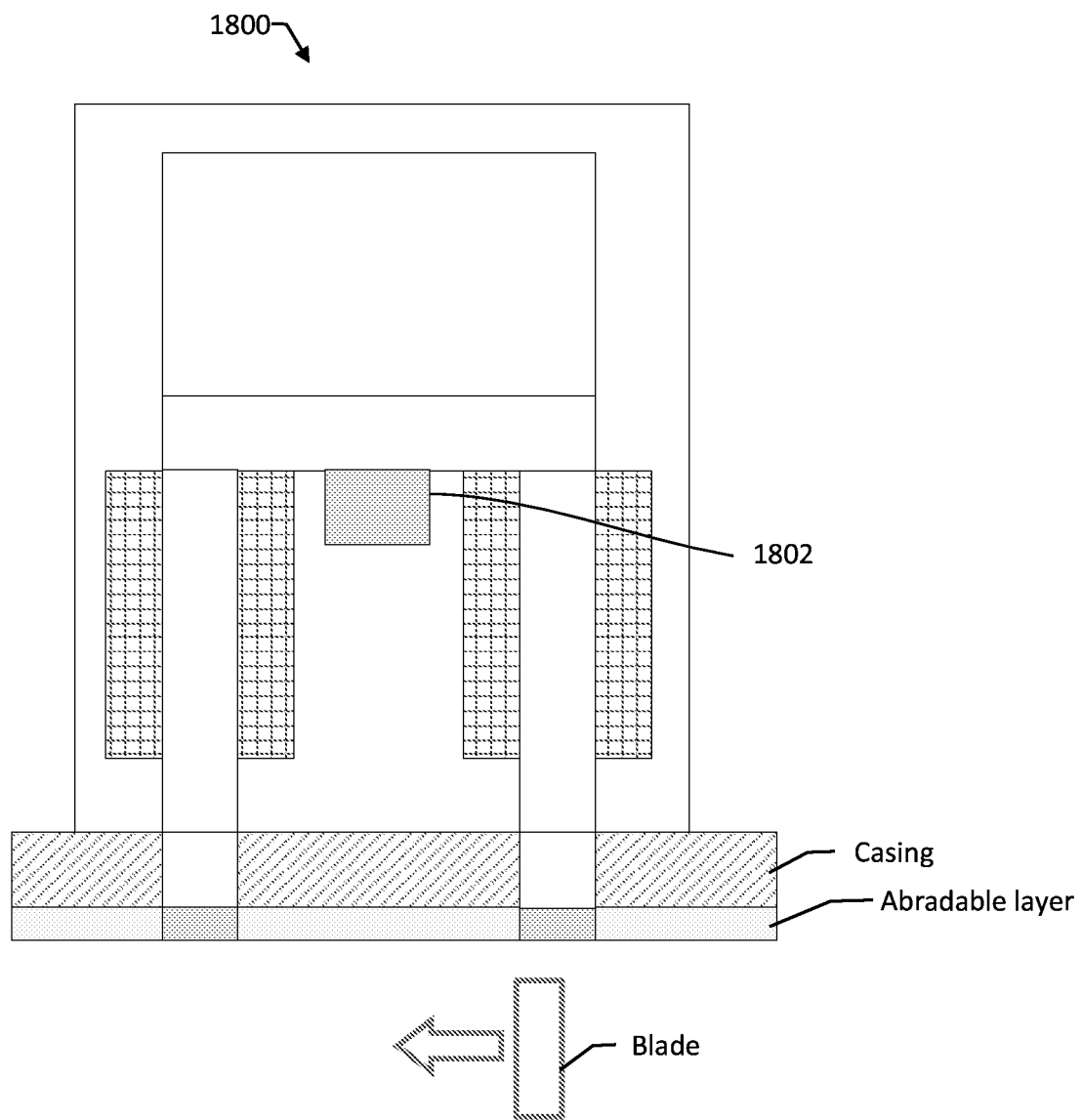
FIG. 18 shows an accelerometer embedded internal to sensor.

In a second example, detecting wear on the abradable layer includes using an accelerometer sensor embed in or near the blade clearance sensor. FIG. 18 shows an example system 1800 including an accelerometer 1802 embedded internal to the sensor. In other cases, the accelerometer may be mounted proximate to the blade clearance.

The high local acceleration from a rub occurrence can trigger a rub detection using standard signal processing and thresholding techniques. The rub detection is then used adjust the calibration of the sensor.

The abradable thickness and/or rub indication can feed into a digital calibration function in the processing unit. The calibration function is shown in FIGS. 16A and 16B and in more detail in FIGS. 19 and 20. This module will take the rub detected and adjust the calibration parameters in real time to provide a new zero-point reference.

Figure 19:
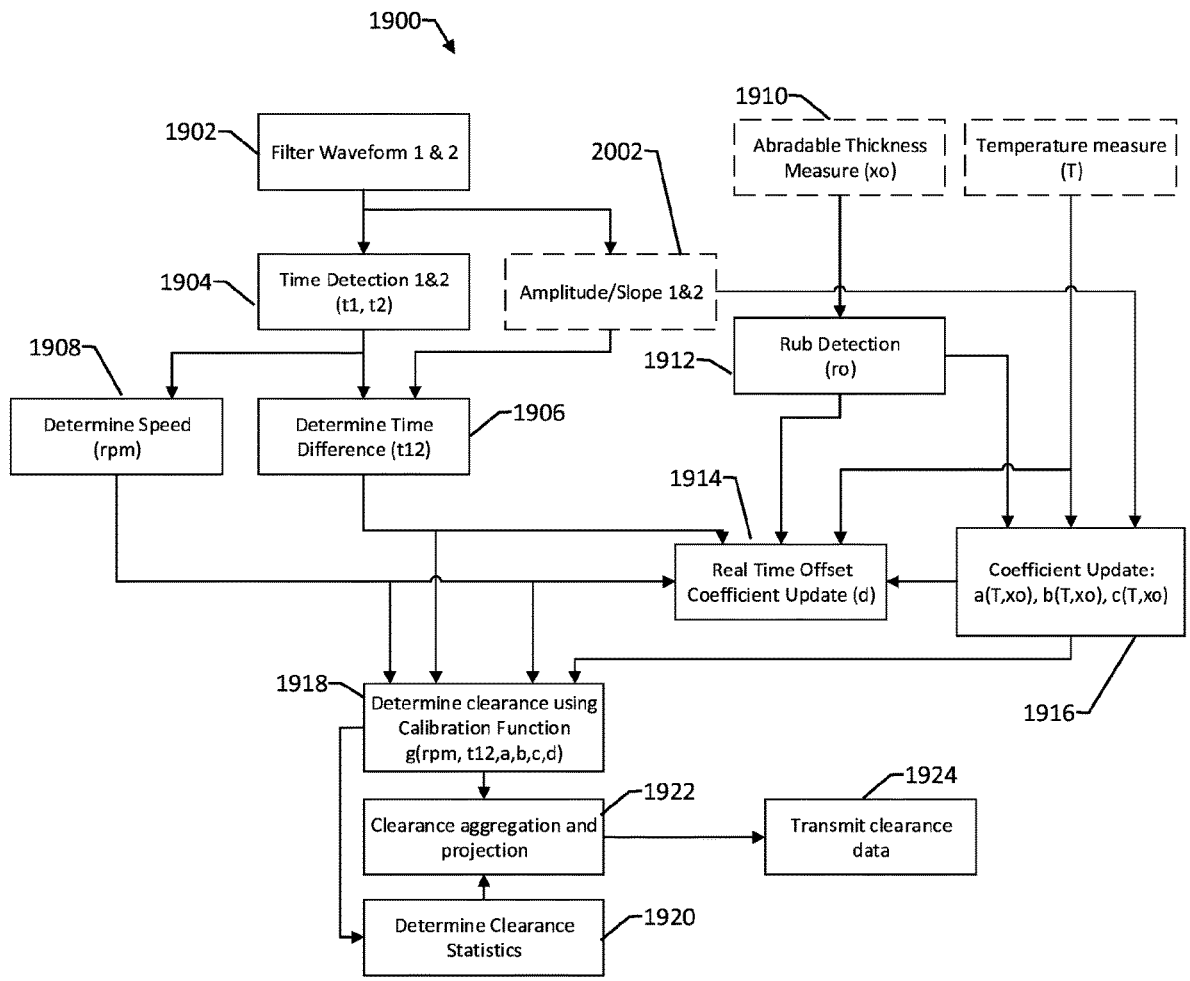
FIG. 19 is a flow diagram illustrating an example calibration process.

FIG. 19 is a flow diagram of an example calibration process 1900. The calibration process uses a comparison of waveform information to determine blade clearance. Some examples of this information can be waveform peak timing, amplitude, or zero cross timing and slope. Optionally the abradable thickness and temperature measurements can be used as inputs into the calibration. The functional blocks of the flow diagram are described below.

Filter Waveform 1902—analog and/or digital filtering used to remove unwanted noise from waveform 1 and waveform 2. Where waveform 1 is the voltage signal from sensing element 1 and waveform 2 is the voltage signal from sensing element 2.

Time Detection 1904—measure of the timing (t1 and t2). Depending on the embodiment, this could be either the zero-cross timing or timing of the (negative or positive) peak voltages for each sensing element. For peak timing, this could be accomplished through standard peak find algorithms with curve fits or wavelet convolutions.

As the waveform is sampled, the values can be stored in a ring buffer. In some examples, when the sensor input crosses a defined threshold on a rising edge, the ADC is disabled and a waveform analysis is performed, beginning with the newest point and working backwards a variable number of points, which depends on rotational speed. The parameters of the waveform related to gap can be waveform amplitude, peak duration (zero cross to zero cross or time to cross a fixed voltage), slope at either zero cross or a fixed voltage (dV/dt), parameters related to a wavelet fitting function, or others.

Determine Time Difference (t12) 1906—the timing difference is found by taking the timing difference between t1 and t2 (t12=t1−t2). The timing difference t12 can be timing difference between peaks in the waveform or using the zero-crossing timing and a measure of the waveform slope. Additionally, the measure of the t12 parameter may be enhanced using waveform amplitude.

Determine Speed 1908—rotational speed of the machine can be calculated using the timing (t1 and/or t2) scaled by the number of targets present (N). In the equation below k represents the present time detection and k−1 represents the prior time detection. The speed signal can be filtered with a moving average filter over a full revolution to eliminate noise on the signal.

$$rpm = \frac{60}{N}\left(\frac{1}{((t_1(k) - t_1(k-1))}\right)$$

Abradable Thickness Measure (xo) 1910— this is a process where the thickness of the abradable can be measured either using a multiple layer rub pin or by measuring changes in the electrical impedance of one or more circuits proximate to the abradable layer (as described in this invention).

Rub Detection (ro) 1912— this detection method looks at the changes in the abradable thickness to determine a rub event. Alternatively, another measure such as acceleration could feed the rub detection function to identify a rub event (as described in in this invention).

Real Time Offset Coefficient Update (d(T, ro)) 1914— when a rub event (ro) is detected, a new offset coefficient (d) needs to be calculated to establish the new zero clearance location. This can be done by setting the calibration function (g) to zero and solving for the offset coefficient given the current input values such as speed (rpm), timing difference (t12), and the other coefficients (a(T,xo), b(T,xo), c(T,xo)). The offset coefficient may also have some dependency on temperature (7). In some embodiments, temperature may be used as an input to adjust the offset coefficient using a curve fit function or lookup table relationship.

Coefficient update (a(T,xo), b(T,xo), c(T,xo)) 1916— the calibration coefficients can have some dependency on temperature and/or abradable thickness. These are optional inputs depending on the embodiment (as denoted by the dashed box in the figure). The sensitivity of the coefficients to these inputs can be pre-capture through test or modeling in the form of a curve fit function or lookup table and then used during operation to adjust the coefficients, that are fed into the calibration function (g).

Clearance Calibration Function (g) 1918— a simple exemplary calibration curve is shown below, where the time difference (t12), speed (rpm), and coefficients (a, b, c, d) are the inputs of the calibration function and clearance or gap (g) is the output, $$g = a(rpm \times t_{12})^2 + b(rpm \times t_{12}) + c(t_{12}) + d$$

An alternative to a calibration function as shown above is a multi-dimensional lookup table with interpolation. This could be used in a similar way as the calibration function for determining clearance. Following the example above, the lookup table could have speed (rpm), time difference (t12), rub detection (ro), abradable thickness (xo), and temperature (T) as inputs to the table(s) and output clearance (g).

Determine Clearance Statistics 1920— statistical measures such as min, mean, max, standard deviation can readily be calculated on an individual blade basis and as a set of blades. Numerical methods such as low filtering or moving average filtering can improve the integrity and robustness of the data. Additionally, historical tracking of these measures can allow for built in health and fault monitoring of the system. These measures and additional information can be useful for the FADEC or Flight computer for monitoring and control purposes.

A separate 1/rev signal can be used to measure engine speed directly, as well as to provide an absolute reference for tracking individual blade clearances over time. It is not required, however, for operation of the system. Tracking of individual blade clearances over time may be used as a health monitoring metric of the engine and may be beneficial to the engine operator.

Clearance aggregation and projection 1922— the clearance data is aggregated and grouped for data transmission. In cases where multiple clearance sensors are used, the clearance information can be used to determine 2-dimensional motion of the machine relative to the sensors (a detailed description of this math can be found in U.S. Pat. No. 7,093,504, which is hereby incorporated by reference in its entirety). The minimum clearance at a location other than the sensor locations can also be estimated using the: the clearance of each blade, projecting the locations of the rotating machine using the calculated 2d motion, and a knowledge of the geometry of the casing. This is useful in cases where there is significant dynamic motion of the rotating portion of the machine relative to the casing or housing.

Transmit Clearance Data 1924—the last step in the process is to transmit relevant clearance data to the FADEC or Flight Control Computer for monitor and control. In some cases, this sensing system electronics and software may be built into the FADEC or Flight Control Computer.

Figure 20:
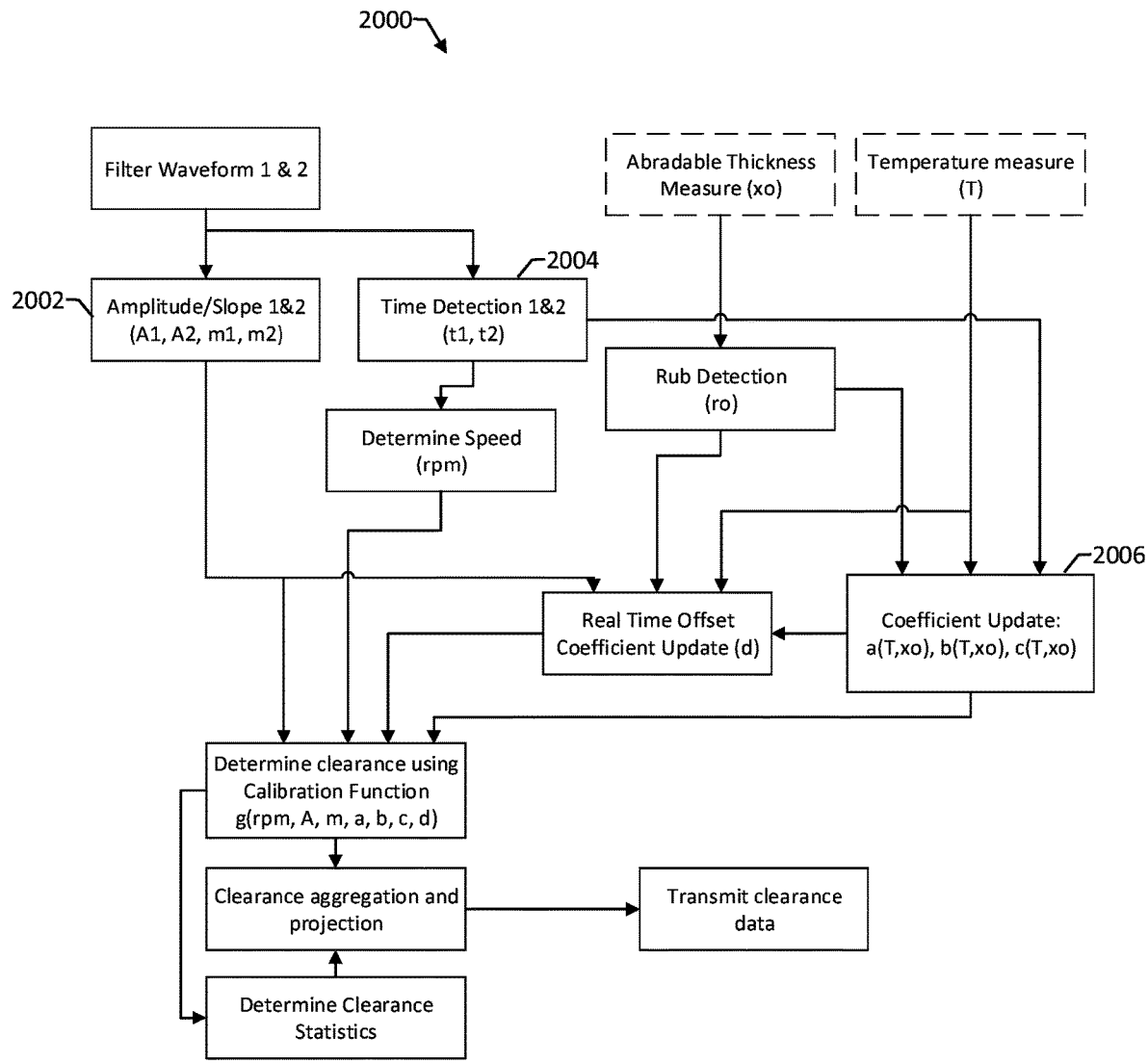
FIG. 20 is a flow diagram illustrating an example of an alternate calibration process.

FIG. 20 illustrates an alternate calibration process 2000. In this case, the amplitude and/or slope 2002 of the waveform are used as the primary measures of clearance and the timing t12 2004 is used as a secondary measure to update the calibration coefficients 2006.

Figure 21:
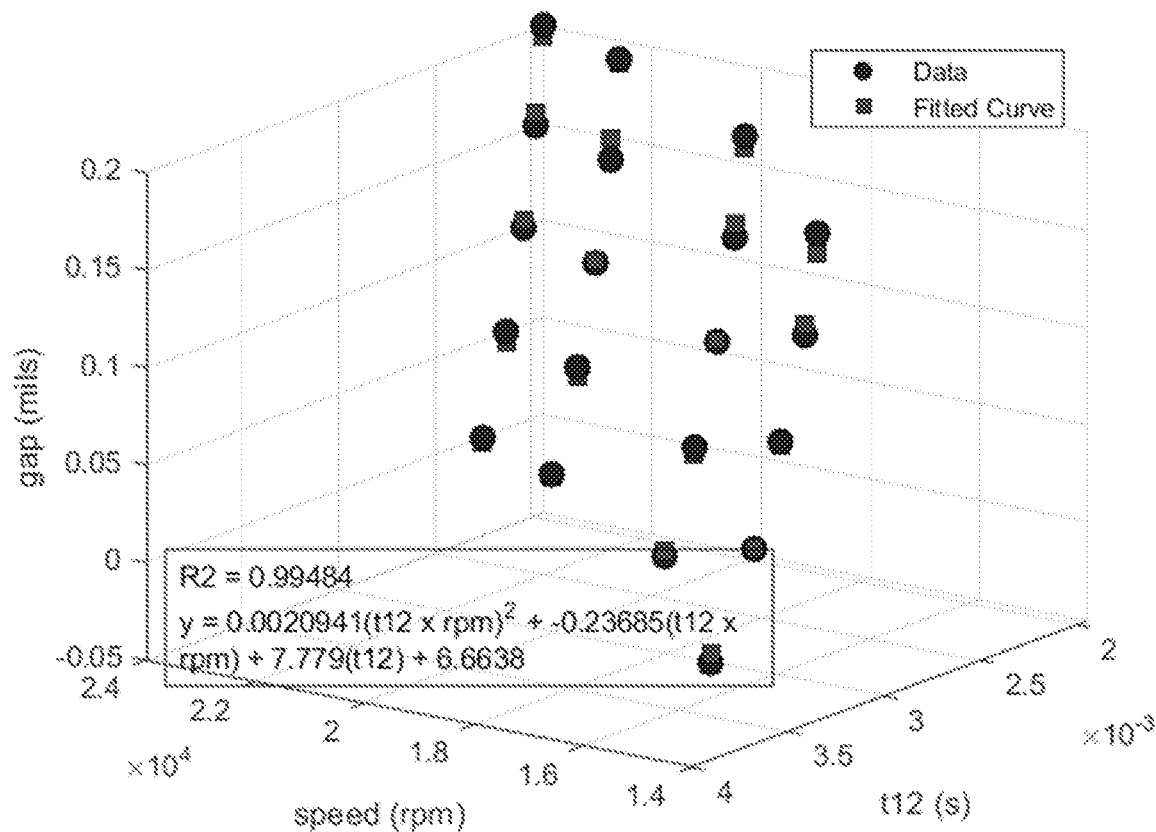
FIGS. 21 and 22 illustrate example calibration results from a set of simulation data.
Figure 22:
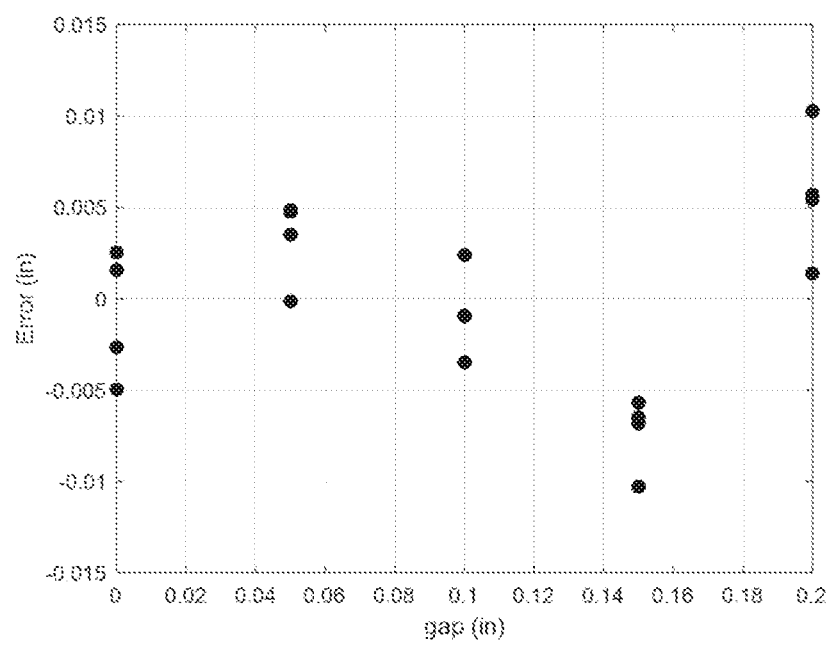

FIGS. 21-22 illustrate example calibration results from a set of simulation data. FIG. 21 shows an overlay of the actual clearance as the darker circles and the calibrated clearance as the squares. With the goodness of fit (R2) shown and the determined calibration coefficients shown in the equation listed in the figure. This data was taken at multiple different gaps and speeds. FIG. 22 shows the measured error as a function of the gap.

Other parameters such as magnet strength, target width, permeability, and conductivity were also varied as part of the simulation study. However, these variations were found to have a negligible impact on the sensor calibration which shows the increased robustness of this measuring system to variabilities in the sensing system and environment.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A system for measuring a clearance between a rotating machine component and an abradable layer on or in a casing of the rotating machine, the system comprising:
   a sensor oriented to detect the rotating machine component as the rotating machine component rotates past the sensor; and
   a sensor processor in electrical communication with the sensor and configured for:
   determining, by rub detection obtained during a calibration, occurrence of a rub event for the abradable layer of the casing;
   determining a distance between the rotating machine component and the sensor; and
   determining the clearance based on the rub detection and the distance between the rotating machine component and the sensor.

2. The system of claim 1, wherein the sensor processor is configured to detect the rub event using an accelerometer sensor embedded in the sensor or proximate to the clearance.

3. The system of claim 1, wherein the sensor comprises at least a first sensing element and a second sensing element spaced apart from the first sensing element.

4. The system of claim 3, wherein:
   the sensor processor unit is configured for:
   receiving a first waveform from the first sensing element; and
   receiving a second waveform from the second sensing element; and
   the distance between the rotating machine component and the sensor is determined by comparing the first waveform and the second waveform.

5. The system of claim 4, wherein comparing the first waveform and the second waveform comprises determining a timing difference between the first waveform and the second waveform.

6. The system of claim 5, wherein comparing the first waveform and the second waveform comprises determining a peak delta time between the first waveform and the second waveform.

7. The system of claim 5, wherein comparing the first waveform and the second waveform comprises determining a first zero-cross timing for the first waveform and a second zero-cross timing for the second waveform.

8. The system of claim 7, wherein comparing the first waveform and the second waveform comprises determining:
a difference between the first zero-cross timing and the second zero-cross timing; and
a slope of the first and second waveforms proximate to the first and second cross timings, respectively.

9. The system of claim 3, wherein:
the first sensing element comprises a first permanent magnet, a first pole piece, and a first sensing coil; and
the second sensing element comprises a second permanent magnet, a second pole piece, and a second sensing coil.

10. The system of claim 3, wherein:
the sensor comprises a magnet and a split pole piece;
the split pole piece comprises a leading pole and a trailing pole;
the first sensing element comprises the leading pole and a leading sensing coil around the leading pole; and
the second sensing element comprises the trailing pole and a trailing sensing coil around the trailing pole.

11. The system of claim 10, wherein the pole piece or magnet is shaped like the rotating machine component.

12. The system of claim 3, wherein the sensor comprises:
a split magnet or 'U' shaped magnet; and
a pole piece in a center of the split magnet.

13. The system of claim 3, wherein the sensor processor is configured for performing the calibration based on one or more of: engine speed, sensor temperature, and/or blade temperature.

14. A method for measuring a clearance between a rotating machine component and an abradable layer on or in a casing of the rotating machine, the method comprising:
rotating the rotating machine component past a sensor;
detecting, using the sensor, the rotating machine as the rotating machine component rotates past the sensor;
providing a sensor processor that is in electrical communication with the sensor;
determining, during a calibration, using the sensor processor and by rub detection, occurrence of a rub event for the abradable layer of the casing;
determining, using the sensor processor, a distance between the rotating machine component and the sensor;
determining, using the sensor processor, the clearance based on the rub detection and the distance between the rotating machine component and the sensor.

15. A system for measuring a clearance between a rotating machine component and an abradable layer on or in a casing of the rotating machine, the system comprising:
a passive eddy current sensor oriented to detect the rotating machine component as the rotating machine component rotates past the passive eddy current sensor, wherein the passive eddy current sensor comprises at least a first sensing element and a second sensing element spaced apart from the first sensing element; and
a sensor processor in electrical communication with the passive eddy current sensor and configured for:
determining, by rub detection obtained during a calibration, occurrence of a rub event for the abradable layer of the casing;
receiving a first waveform from the first sensing element;
receiving a second waveform from the second sensing element;
determining a distance between the rotating machine component and the passive eddy current sensor by comparing the first waveform and the second waveform to determine a timing difference between the first waveform and the second waveform; and
determining the clearance based on the rub detection and the distance between the rotating machine component and the passive eddy current sensor.

* * * * *